(12) United States Patent  (10) Patent No.: US 9,022,403 B2
Lam et al.  (45) Date of Patent: May 5, 2015

(54) VEHICLE FRONT SUSPENSION

(71) Applicant: Nissan North America, Inc., Franklin, TN (US)

(72) Inventors: Joyce Lam, Bloomfield Hills, MI (US); Ryan Corby, Novi, MI (US); Jeffery Dix, Commerce Twp., MI (US); Mark Snyder, Beverly Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 56 days.

(21) Appl. No.: 13/794,086

(22) Filed: Mar. 11, 2013

(65) Prior Publication Data
US 2014/0252742 A1  Sep. 11, 2014

(51) Int. Cl.
B60G 3/04 (2006.01)
B60G 7/00 (2006.01)
B60G 7/02 (2006.01)

(52) U.S. Cl.
CPC ........................................ B60G 7/02 (2013.01)

(58) Field of Classification Search
CPC .............. B60G 3/00; B60G 3/02; B60G 3/04; B60G 3/06; B60G 7/00; B60G 7/001; B60G 7/02; B60G 2200/142; B60G 2200/1424; B60G 2204/1431; B60G 2204/1432
USPC ......... 280/124.1, 124.128, 124.134, 124.135, 280/124.145, 124.146, 124.147, 93.512, 280/93.51, 784; 296/187.03, 187.09, 187.1
See application file for complete search history.

(56) References Cited

U.S. PATENT DOCUMENTS

| 4,911,417 | A | * | 3/1990 | Short | 267/256 |
| 4,995,633 | A |   | 2/1991 | Santo |  |
| 5,263,778 | A | * | 11/1993 | Jordens et al. | 384/140 |
| 5,601,304 | A | * | 2/1997 | Tilly et al. | 280/124.15 |
| 5,607,177 | A | * | 3/1997 | Kato | 280/124.134 |
| 5,845,938 | A | * | 12/1998 | Kato | 280/784 |
| 5,938,220 | A | * | 8/1999 | Torneld | 280/124.145 |
| 5,975,541 | A | * | 11/1999 | Harara et al. | 280/5.524 |
| 6,298,962 | B1 | * | 10/2001 | Kato et al. | 188/371 |
| 6,367,830 | B1 |   | 4/2002 | Annequin et al. |  |
| 6,705,627 | B2 | * | 3/2004 | Hasebe et al. | 280/124.134 |
| 6,994,374 | B2 | * | 2/2006 | Miyasaka | 280/784 |
| 7,571,917 | B2 | * | 8/2009 | Ruehe et al. | 280/124.1 |
| 7,628,415 | B2 | * | 12/2009 | Kitamura et al. | 280/124.154 |
| 8,646,793 | B1 | * | 2/2014 | Lam et al. | 280/124.145 |
| 2002/0180171 | A1 | * | 12/2002 | Hasebe et al. | 280/124.134 |
| 2013/0241166 | A1 | * | 9/2013 | Paintmayer et al. | 280/124.125 |

* cited by examiner

Primary Examiner — Ruth Ilan
Assistant Examiner — Barry Gooden, Jr.
(74) Attorney, Agent, or Firm — Global IP Counselors, LLP

(57) ABSTRACT

A vehicle front suspension includes a suspension support structure, a transverse link, a front link breakaway structure and a rear link breakaway structure. The transverse link has an inboard side with a front connection structure connecting a front end of the transverse link to the suspension support at a first location and a rear connection structure pivotally connecting a rear end of the transverse link to the suspension support at a second location that is spaced rearwardly of the first location. The front link breakaway structure is configured to release the front end of the transverse link from the suspension support upon application of a prescribed rearward directed force on the vehicle front suspension outboard of the suspension support structure. The rear link breakaway structure is configured to release the rear connection structure of the transverse link from the suspension support upon rearward rotation of the transverse link about the rear connection structure.

20 Claims, 22 Drawing Sheets

VEHICLE FRONT SUSPENSION

BACKGROUND

1. Field of the Invention

The present invention generally relates to a vehicle front suspension. More specifically, the present invention relates to a vehicle front suspension that includes at least one breakaway structure that facilitates release of a front wheel in response to an impact event in a frontal offset test.

2. Background Information

Vehicle body structures are regularly being redesigned to include structural features that absorb impact forces in response to impact events. Recently introduced impact event tests include a frontal offset test where a vehicle is provided with velocity in a vehicle longitudinal direction (forward momentum) such that a front corner of the vehicle (approximately 25 percent of the overall width of the vehicle) impacts a fixed, rigid barrier. FIGS. 1, 2 and 3 schematically show an example of a conventional vehicle V undergoing an impact event with a fixed barrier B in accordance with the frontal offset test.

FIG. 1 shows the conventional vehicle V approaching the rigid barrier B in the frontal offset test. FIG. 2 shows the conventional vehicle V just after initial impact with the rigid barrier B showing initial deformation and forward momentum being transformed into rotational displacement about the rigid barrier B. FIG. 3 shows the conventional vehicle V undergoing further deformation and rotation as a result of the impact event.

SUMMARY

One object is to provide breakaway structures that release a wheel of the vehicle such that the wheel moves out of a vehicle wheel well during an impact event of a frontal offset test.

In view of the state of the known technology, one aspect of the present disclosure is to provide a vehicle front suspension with a suspension support structure, a transverse link, a front link breakaway structure and a rear link breakaway structure. The transverse link has an inboard side with a front connection structure connecting a front end of the transverse link to the suspension support at a first location and a rear connection structure pivotally connecting a rear end of the transverse link to the suspension support at a second location that is spaced rearwardly of the first location. The front link breakaway structure is configured to release the front end of the transverse link from the suspension support upon application of a prescribed rearward directed force on the vehicle front suspension outboard of the suspension support structure. The rear link breakaway structure is configured to release the rear connection structure of the transverse link from the suspension support upon rearward rotation of the transverse link about the rear connection structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIG. 4-10, a vehicle 10 is illustrated in accordance with a first embodiment. The vehicle 10 is provided with a plurality of wheel releasing features of a front suspension 12 of the vehicle 10 that are configured to release a wheel 14 in response to an impact event such as a small overlap test, such that the wheel 14 moves out of a wheel well 16 of the vehicle 10 during the impact event.

Figure 1:
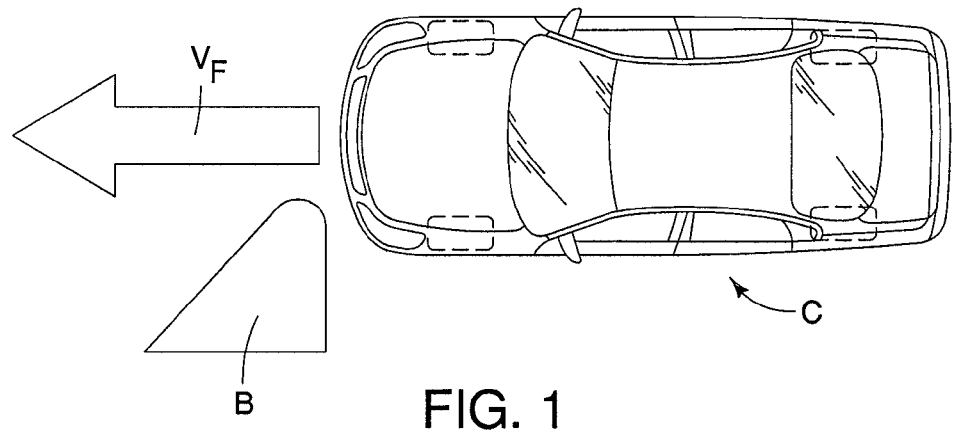
FIG. 1 is a schematic view of a conventional moving vehicle showing its response to a small overlap test where a front corner of the vehicle is aligned with a fixed, rigid barrier for eventual impact with the barrier.
Figure 2:
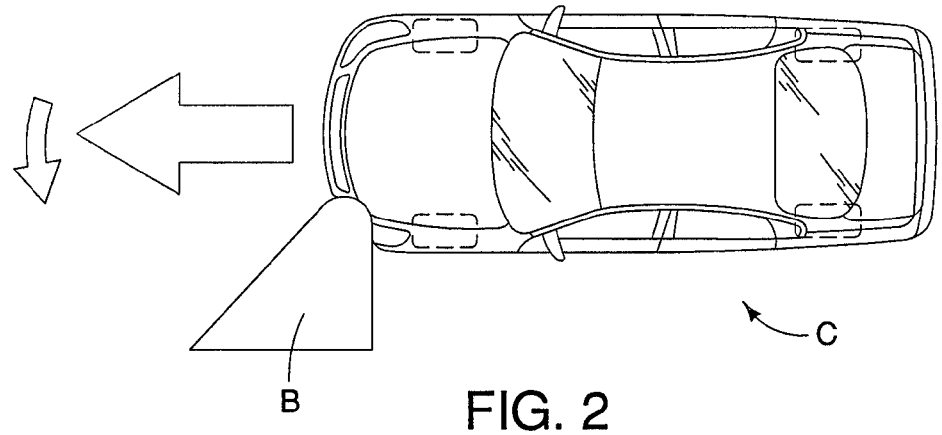
FIG. 2 is another schematic view of the conventional vehicle showing its response to the small overlap test at the beginning of an impact event with the front corner of the conventional vehicle impacting the barrier and beginning to undergo deformation.
Figure 3:
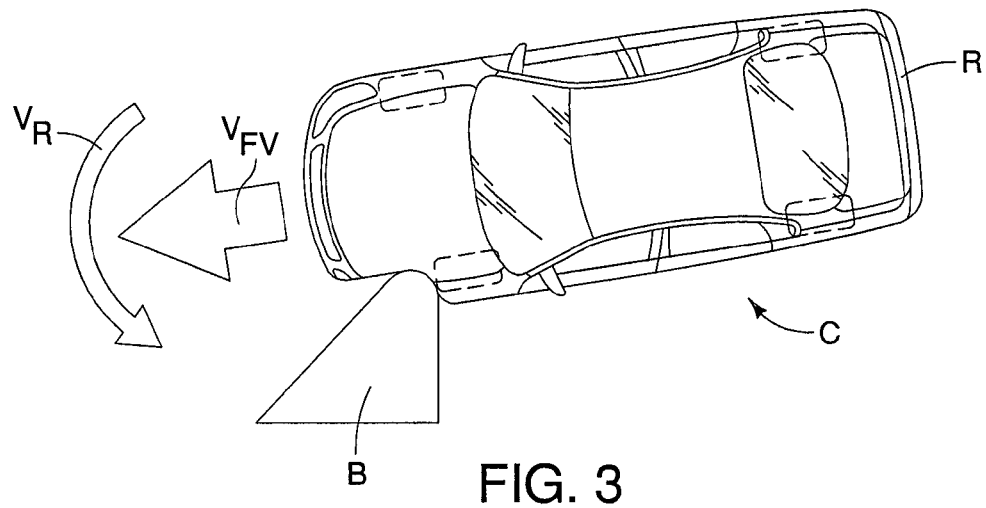
FIG. 3 is still another schematic view of the conventional vehicle showing its response to the small overlap test with the conventional vehicle undergoing further deformation during the impact event.

The Insurance Institute for Highway Safety (IIHS) has developed various tests where vehicles are provided with forward velocity and impacted against fixed, rigid barriers, like the rigid barrier B depicted in FIGS. 1-3. In the IIHS offset tests, the conventional vehicle C is aimed at the rigid barrier B such that approximately 25 percent of the front of the conventional vehicle C impacts the rigid barrier B. In other words, as indicated in FIGS. 1-3, only a front corner of the conventional vehicle C impacts the rigid barrier B. This IIHS test is also known as a frontal offset, narrow offset, or small overlap test. In such tests, a front bumper assembly of the conventional vehicle C is either not impacted, or undergoes only limited contact with the rigid barrier B during the impact event. Therefore, other structures at the front of the conventional vehicle C impact the rigid barrier B and absorb at least some of the kinetic energy associated with the rapid deceleration of the vehicle C that results from the impact event. When the vehicle C is provided with velocity and impacts the rigid barrier B, the rapid deceleration of the vehicle C transforms the kinetic energy associated with the mass and velocity of the vehicle C into deformation of the vehicle C and counter movement of the vehicle C. As is well known, kinetic energy is a function of mass times velocity. During the small offset test, the kinetic energy of the vehicle C is partially absorbed and partially transformed into other forms of kinetic energy, such as rotary motion. It should be understood that the kinetic energy associated with the forward velocity of the vehicle C (and in the description below) is transformed into an impacting force upon impact due to the rapid deceleration of the vehicle C. Consequently, hereinbelow, the terms impact force and impacting force as used herein correspond to the kinetic energy applied to the vehicle 10 during the small overlap test (the impact event), as described below with respect to the various embodiments.

The test is represented schematically in FIGS. 1-3. During the impact event, a variety of structures undergo deformation. This deformation is not explicitly depicted in FIGS. 2 and 3 with any degree of accuracy because such deformation varies from conventional vehicle to conventional vehicle, depending upon the overall design of the front structure of the conventional vehicle C. Instead, in FIG. 3, the conventional vehicle C is depicted with a generic degree of deformation as a result of the impact event. However, the conventional vehicles tested by the IIHS using the small overlap test have a relatively consistent response in that during the impact event with the rigid barrier B, the rear end R of the conventional vehicle C undergoes some rotation and swings laterally away from the rigid barrier B, as indicated in FIG. 3.

In other words, the forward velocity $F_F$ of the conventional vehicle C as it moves is transformed upon impact with the rigid barrier B. The velocity $F_F$ results in an equal and opposite reaction force acting on the vehicle C as the vehicle C suddenly decelerates. It is desirable to move the vehicle laterally outward from the barrier and avoid unnecessary loading of the dash-wall and/or A-pillar.

Figure 4:
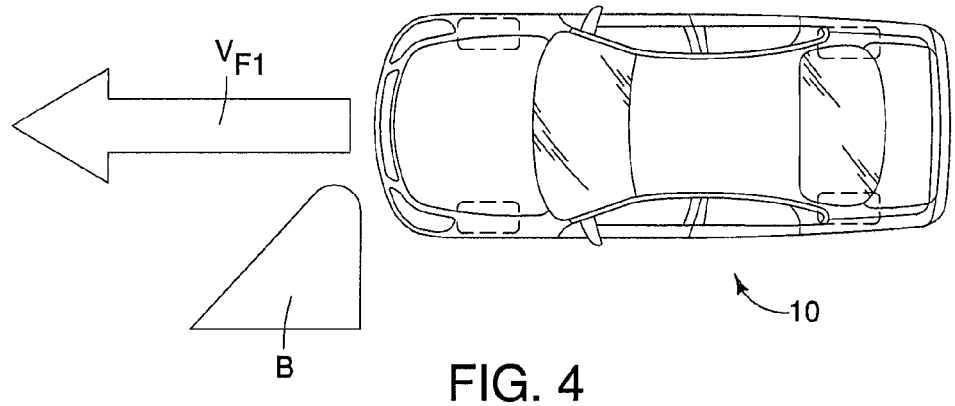
FIG. 4 is a schematic view of a moving vehicle being subjected to a small overlap test where approximately 25 percent of the front of the vehicle aligned with a fixed, rigid barrier for eventual impact with the barrier in accordance with various embodiments.
Figure 5:
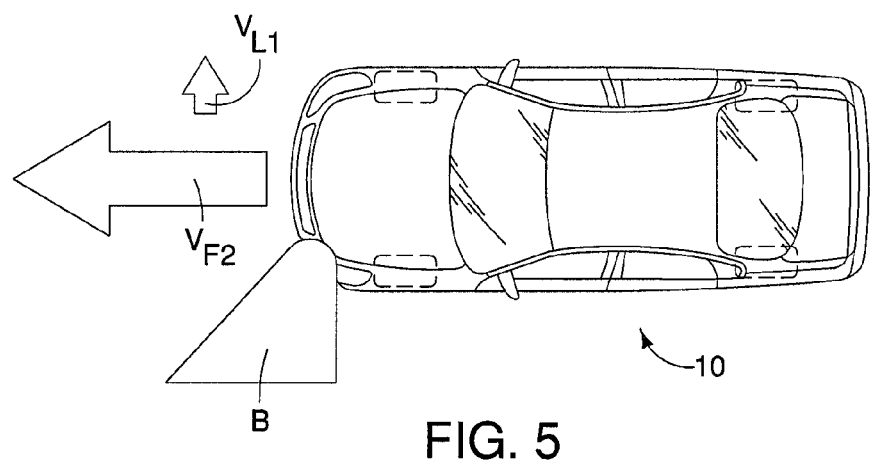
FIG. 5 is another schematic view of the vehicle depicted in FIG. 4 showing an initial response to the impact event of the small overlap test with a front corner of the vehicle impacting the barrier and beginning to undergo deformation in accordance with the various embodiments.
Figure 6:
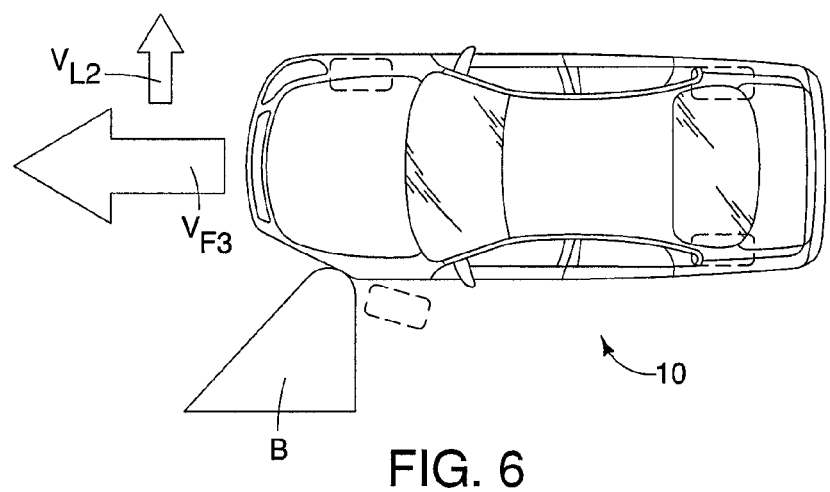
FIG. 6 is still another schematic view of the vehicle depicted in FIGS. 4 and 5 showing a subsequent response to the impact event of the small overlap test with the moving vehicle undergoing further deformation during the impact event and with a front wheel moving laterally out of a wheel well of the vehicle in accordance with at least one embodiment.

The wheel releasing features of the various embodiments described hereinbelow, when employed in the vehicle 10, are configured such that during an impact event, such as a small overlap test, the wheel 14 is consistently released from the front suspension 12 and moves laterally out of the wheel well 16 of the vehicle 10, as shown in FIGS. 4, 5 and 6. Specifically, in FIG. 4 the vehicle 10 is provided with a forward velocity $V_{F1}$ and is subjected to a small overlap test where approximately 25 percent of the front of the vehicle aligned with the rigid barrier B. In FIG. 5 the vehicle 10 undergoes an initial response to the impact event of the small overlap test with a front corner of the vehicle impacting the barrier and beginning to undergo deformation. Hence, the forward velocity $V_{F1}$ is reduced to a velocity $V_{F2}$. In FIG. 6, the vehicle 10 undergoes a subsequent response to the impact event in that one or more of the vehicle releasing features has functioned properly and released the front wheel, such that the front wheel moves laterally out of a wheel well of the vehicle 10, and the forward velocity $V_{F1}$ is reduced to a velocity $V_{F3}$.

It should be understood from the drawings and the description herein, that during an impact event, such as the small overlap test, the reaction forces experienced by the vehicle 10 as it impacts the rigid barrier B are significant. These significant reaction forces are exponentially greater than the forces the structures of the vehicle 10 undergo during normal operating usage of the vehicle 10. In other words, the impact events referred to herein are intended as destructive tests. Further, the impact events of the small overlap tests are configured to impact the vehicle 10 such that the rigid barrier B impact the vehicle 10 at portions of the vehicle 10 outboard of a lower suspension support structure, which includes an engine cradle 46 that is described in greater detail below.

In the various embodiments described below, the vehicle 10 includes at least one, or a combination of two or more of a plurality of the wheel releasing features. The wheel releasing features are included in various structural elements that at least partially define the front suspension 12 shown in FIGS. 8-10, and described in greater detail below.

Figure 7:
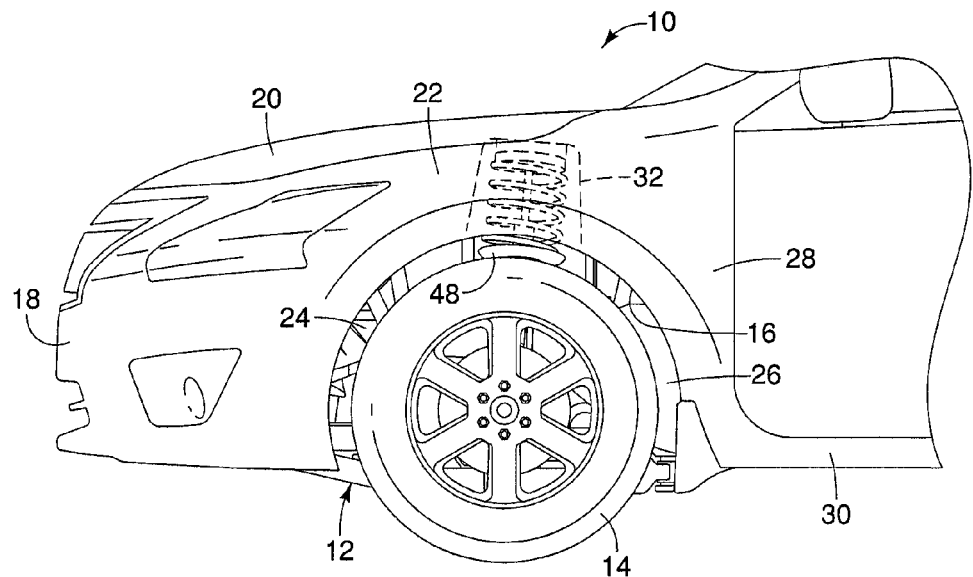
FIG. 7 is side view of a front end of the vehicle showing portions of a front suspension in accordance with a first embodiment.

A brief description of the vehicle 10 is now provided with specific reference to FIG. 7. The vehicle 10 includes a variety of conventional elements, such as a front bumper assembly 18, a hood 20, fenders 22, a front side member 24, a dash wall 26, an A-pillar 28 and a sill 30.

The front bumper assembly 18 is a conventional assembly at the front of the vehicle 10. The hood 20 conceals an engine compartment and is typically hinged to move between a closed position (FIG. 7) and an open position (not shown). The fenders 22 are conventional elements that cover sides of the vehicle 10. As shown in FIG. 7, the depicted fender 22 at least partially defines the wheel well 16. The front side member 24 is a structural beam-like assembly that extends from the front bumper assembly 18 rearward to the dash wall 26 and further rearward under the passenger compartment of the vehicle 10. The front side member 24 is a conventional structure that extends in a vehicle longitudinal direction and supports a variety of elements of the vehicle 10, including the front suspension 12. The dash wall 26 extends laterally from side-to-side within the vehicle 10 dividing the passenger compartment from the engine compartment. The A-pillar 28 and the sill 30 are structural elements that at least partially define a front door opening and are rigidly coupled via intermediary structural elements to the front side member 24.

It should be understood that there are two front side members 24, two A-pillars 28 and two sills 30 in the vehicle 10. Only one side of the vehicle 10 is shown in FIG. 7 and hence only one of the front side members 24, one of the A-pillars 28 and one of the sills 30 are visible. Description of one of the front side members 24, one of the A-pillars 28 and one of the sills 30 applies equally to both sides of the vehicle 10. Since the various portions of the body structure of the vehicle 10 are conventional, further description is omitted for the sake of brevity.

As indicated in FIG. 7, the vehicle 10 also includes a strut tower 32. The strut tower 32 is a conventional structure within the engine compartment that is rigidly coupled to the front side member 24. The strut tower 32 defines at least part of an upper suspension support structure of the vehicle 10.

Figure 8:
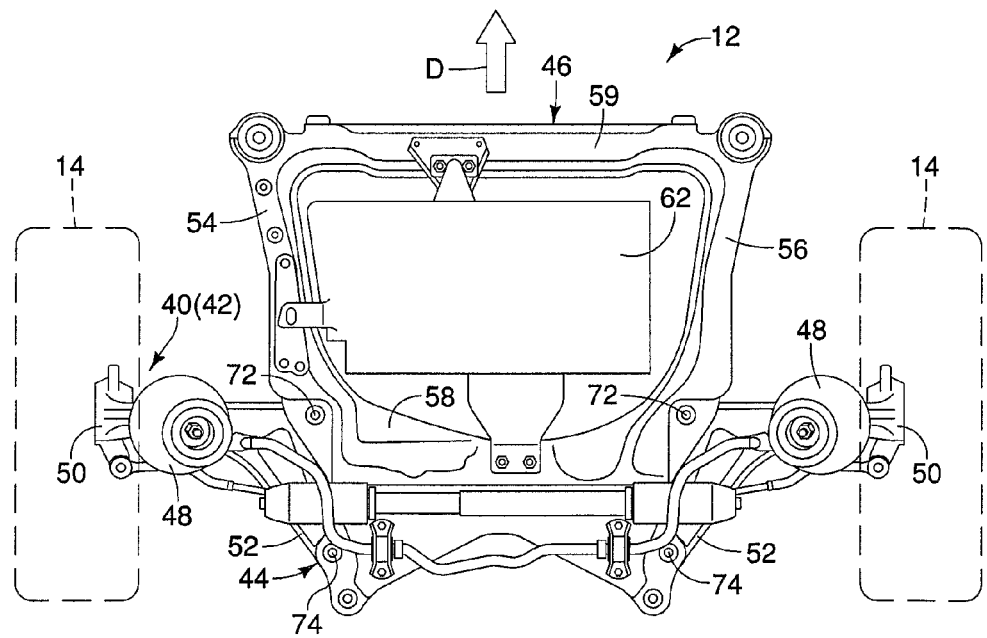
FIG. 8 is a top view of portions of the front suspension of the vehicle depicted in FIG. 7, with the front suspension removed from the vehicle showing an engine cradle, steering components, struts, steering knuckles and transverse links, the front suspension having a plurality of wheel releasing features, including an upper knuckle breakaway structure, a lower knuckle breakaway structure and a transverse link breakaway structure, in accordance with a first embodiment.
Figure 9:
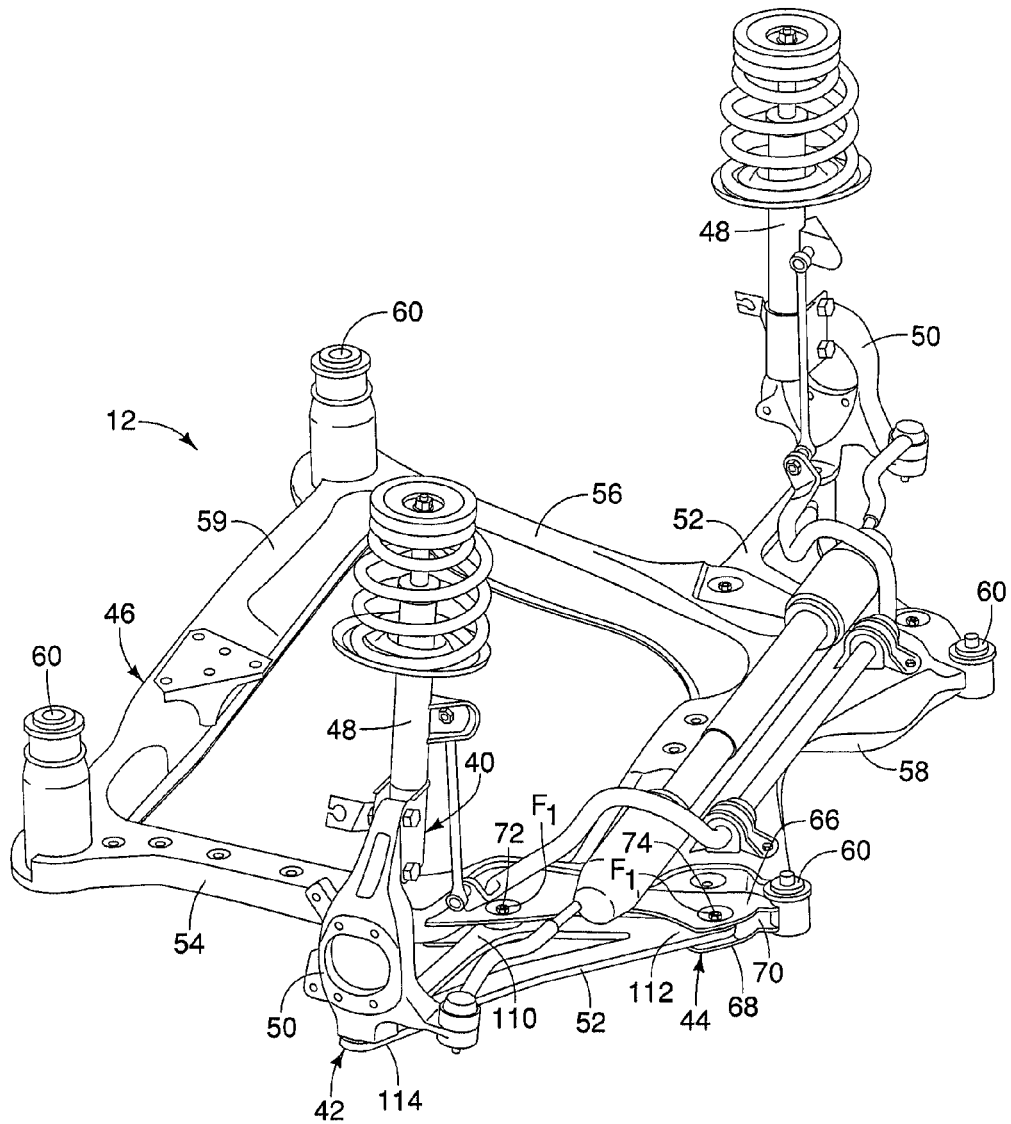
FIG. 9 is a perspective view of the portions of the front suspension of the vehicle depicted in FIG. 8, showing the engine cradle, the struts, the steering knuckles and the transverse links in accordance with the first embodiment.
Figure 10:
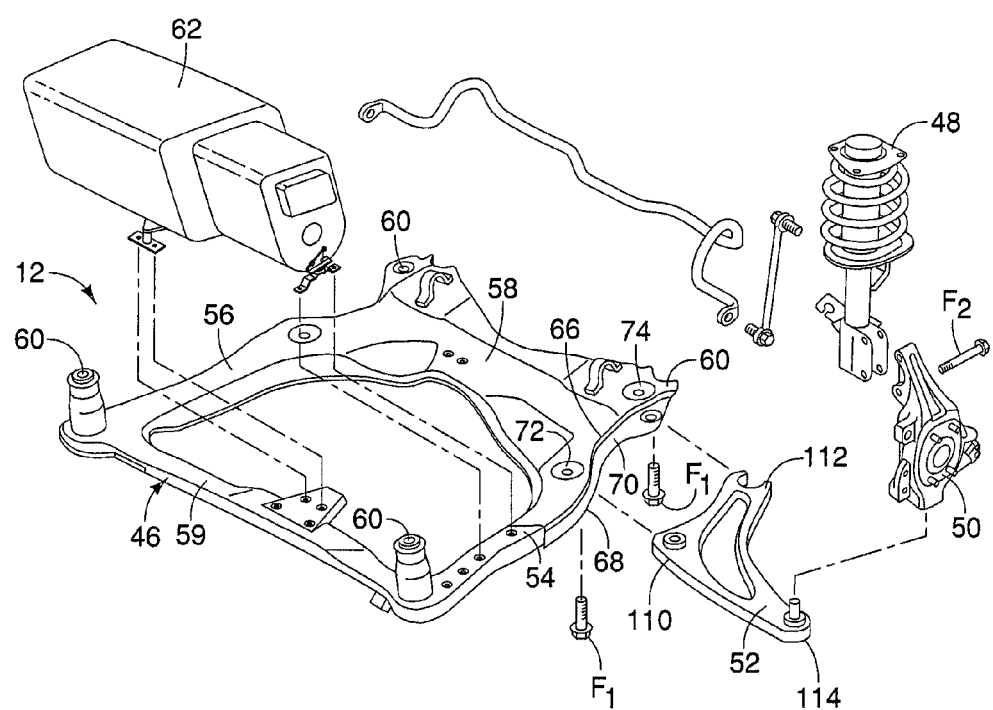
FIG. 10 is an exploded perspective view of the portions of the front suspension of the vehicle depicted in FIGS. 8 and 9, showing the engine cradle, a strut, a steering knuckle and a transverse link in accordance with the first embodiment.

FIGS. 8-10 show the front suspension 12 removed from the front side member 24 and removed from the vehicle 10. The front suspension 12 includes a plurality of wheel releasing features, such as an upper knuckle breakaway structure 40, a lower knuckle breakaway structure 42 and a transverse link breakaway structure 44, which are described in greater detail below after a description of various other features of the front suspension 12. As used herein below, the term breakaway structure include frangible structures and frangible parts (parts that break or deform allowing release of connections between two separate elements) and also refers to parts or structures where two connected parts are released from connection with one another without breakage of either of the two connected parts.

As shown in FIGS. 8-10, the front suspension 12 includes the engine cradle 46 (a lower suspension support structure as mentioned above), struts 48, steering knuckles 50 and transverse links 52. Since the struts 48, the steering knuckles 50 and the transverse links 52 are identical (except that they are symmetrical mirror images of one another), description of only one will apply to both. Each of the wheels 14 is secured to a corresponding one of the steering knuckles 50 via conventional bearing structures (not shown) as indicated in FIG. 8. The arrow D in FIG. 8 indicates a forward longitudinal direction of the vehicle 10.

The engine cradle 46 includes a driver's side engine cradle member 54, a passenger's side engine cradle member 56 and a rear engine cradle member 58. The driver's side engine cradle member 54 includes an engine mount attachment portion, but otherwise includes all of the features the passenger's side engine cradle member 56 (they otherwise symmetrical mirror images of one another). Therefore, description of the driver's side engine cradle member 54 also applies to the passenger's side engine cradle member 56. The engine cradle 46 also includes a front engine cradle member 59 that extends between the driver's side engine cradle member 54 and the passenger's side engine cradle member 56. However, since the front engine cradle member 59 is a conventional portion of the engine cradle 46, further description is omitted for the sake of brevity.

The rear engine cradle member 58 extends between rearward ends of the driver's side engine cradle member 54 and the passenger's side engine cradle member 56. The rear engine cradle member 58 supports elements of the steering linkage of the front suspension 12. However, since the various elements of the steering linkage are conventional components, further description is omitted for the sake of brevity.

The engine cradle 46 also includes body attachment points 60, located at the four corners of the engine cradle 46, as indicated in FIGS. 8-10. The body attachment points 60 are located for removable attachment via fasteners (not shown) to the underside of the vehicle 10. More specifically, the body attachment points 60 attach to the front side members 24 of the vehicle 10. An engine assembly 62 is supported on the engine cradle 46. However, since the engine assembly 62 is a conventional component of the vehicle 10, further description is omitted for the sake of brevity.

As shown in FIG. 9, a rearward section of the driver's side engine cradle member 54 includes an upper flange 66 and a lower flange 68, with a recess 70 defined between the upper flange 66 and the lower flange 68. The upper flange 66, the lower flange 68 and the recess 70 basically define a lower suspension support structure of the engine cradle 46. More specifically, the transverse link 52 is installed within the recess 70 and attached to the driver's side engine cradle member 54 by fasteners that extend through apertures of the upper flange 66 and the lower flange 68. As is indicated in FIG. 9, the transverse link 52 is attached at a first location 72 and a second location 74 of the lower suspension support structure by fasteners $F_1$. The first location 72 defines a front link attachment point for the transverse link 52 and the second location 74 defines a rear link attachment point for the transverse link 52.

Figure 11:
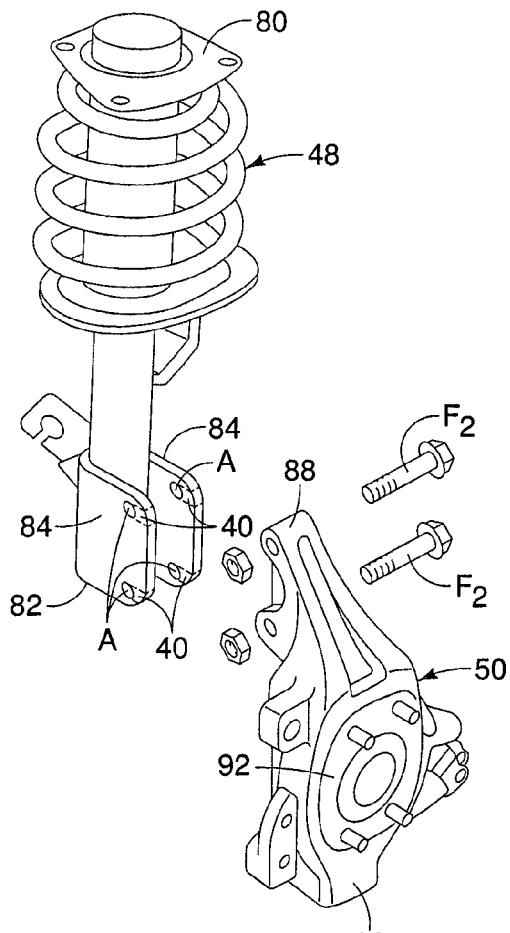
FIG. 11 is an exploded perspective view of the strut and the steering knuckle of the front suspension showing an upper knuckle breakaway structure in accordance with the first embodiment.

A description of the strut 48 is now provided with specific reference to FIG. 11. The strut 48 includes an upper end 80 and a lower end 82. As indicated in FIG. 7, the upper end 80 is removably fastened to the strut tower 32 (the upper suspension support structure) in a conventional manner. The lower end 82 is configured to pivot relative to the upper end 80 in order to facilitate steering of the vehicle 10. The lower end 82 includes a pair of knuckle attachment flanges 84, as shown in FIG. 11. Each of the knuckle attachment flanges 84 includes a pair of apertures A that receive the fasteners $F_2$.

Figure 12:
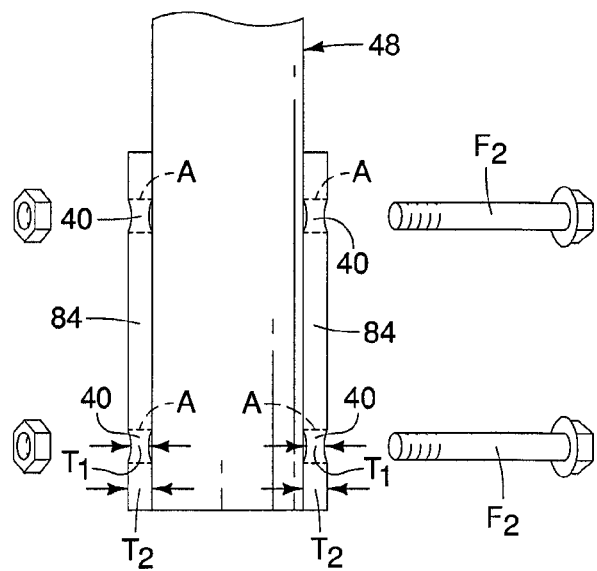
FIG. 12 is a side view of a lower end of the strut showing details of knuckle attachment flanges that include the upper knuckle breakaway structure in accordance with the first embodiment.

In the first embodiment, the knuckle attachment flanges 84 define the upper knuckle breakaway structure 40. Specifically, the upper knuckle breakaway structure 40 is defined by an area on each of the knuckle attachment flanges 84 adjacent to each of the apertures A. Each of the knuckle breakaway structures 40 are frangible parts that are inclined downward in a vehicle outboard direction from the apertures A (fastener receiving openings). Each of the upper knuckle breakaway structures 40 has a first thickness $T_1$, as indicated in FIG. 12.

Each of the knuckle attachment flanges 84 has a second thickness $T_2$, with the second thickness $T_2$ being greater than the first thickness $T_1$. It should be understood from the drawings and the description herein that the thickness $T_1$ is not necessarily a reduction in thickness as compared to conventional struts. Rather, the thickness $T_2$ can be increased relative to conventional struts. In other words, the upper knuckle breakaway structures 40 are frangible parts. The lower end 82 of the strut 48 is therefore connected to an upper end 88 of the steering knuckle 50 by the upper knuckle breakaway structures 40 which have a predetermined frangible part that releases the upper end 88 of the steering knuckle 50 from the strut 48 upon application of a prescribed rearward directed force on at least one of the engine cradle 46 (the lower suspension support structure) and the steering knuckle 50.

Figure 13:
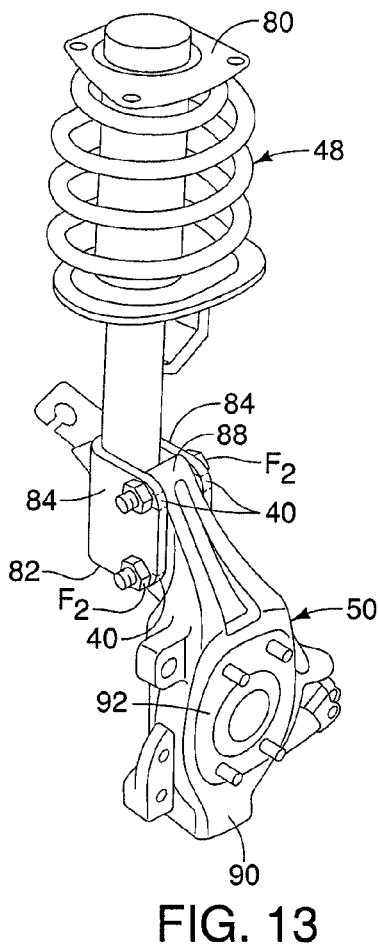
FIG. 13 is a perspective view of the strut and the steering knuckle of the front suspension fully assembled showing the upper knuckle breakaway structure in accordance with the first embodiment.
Figure 14:
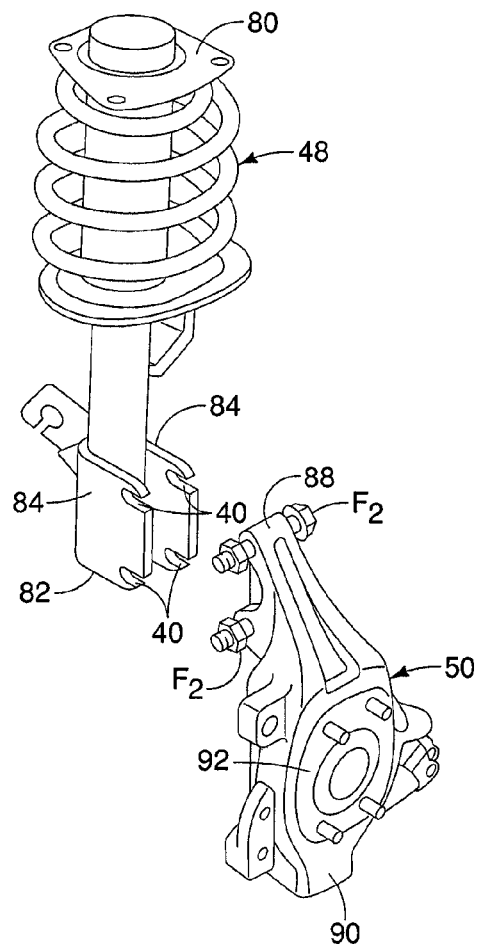
FIG. 14 is a perspective view of the strut and the steering knuckle of the front suspension showing the upper knuckle breakaway structure after an impact event releasing the steering knuckle from the lower end of the strut in accordance with the first embodiment.

Thus, during an impact event as the small overlap test, release of the wheel 14 from the wheel well 16 is facilitated by the breakage of the knuckle attachment flanges 84 at the upper knuckle breakaway structures 40. Specifically, FIG. 13 shows the strut 48 attached to the steering knuckle 50 by the fasteners $F_2$ during operation of the vehicle 10. During operation of the vehicle 10 (driving), the strut 48 and the steering knuckle 50 are rigidly secured to one another. During the impact event, if breakage occurs, the upper knuckle breakaway structures 40 deform, releasing the fasteners $F_2$ and the steering knuckle 50 (along with the wheel 14) such that they are free to move away from the strut 48 and out of the wheel well 16, as shown in FIG. 14.

Figure 15:
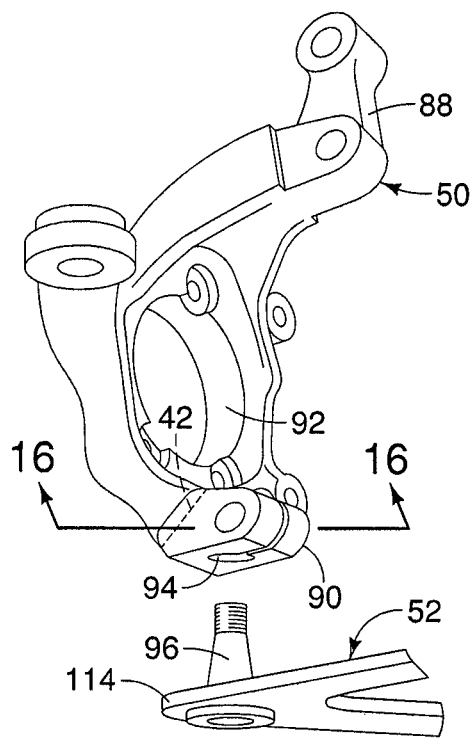
FIG. 15 is an exploded perspective view of the steering knuckle and an outboard end of the transverse link of the front suspension showing a lower knuckle breakaway structure in accordance with the first embodiment.
Figure 16:
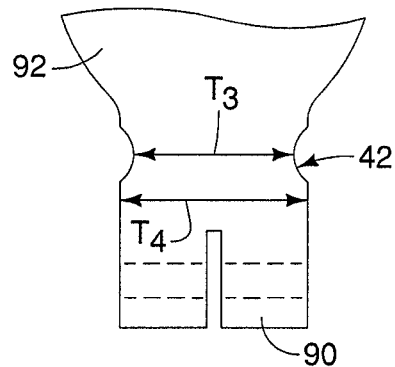
FIG. 16 is a side view of a lower end of the steering knuckle showing details of the lower knuckle breakaway structure in accordance with the first embodiment.

As shown in FIG. 15, the steering knuckle 50 includes an upper end 88, a lower end 90 and a wheel supporting section 92. The upper end 88 defines an attachment collar that includes a pair of apertures dimensioned to receive the fasteners $F_2$ for attachment to the strut 48 in a manner described above and shown in FIG. 13. The pair of apertures in the upper end 88 of the steering knuckle 50 defines a strut attachment portion. As shown in FIG. 15, the lower end 90 includes a ball joint receiving aperture 94 dimensioned to receive a ball joint 96 of the transverse link 52. The lower end 90 also includes the lower knuckle breakaway structure 42. As shown in FIG. 16, the lower knuckle breakaway structure 42 has a thickness $T_3$ that is less than the thickness $T_4$ of adjacent areas of the lower end 90 of the steering knuckle 50. Put another way, the cross-sectional area of the lower knuckle breakaway structure 42 is less than the cross-sectional area of the adjacent areas of the lower end 90 of the steering knuckle 50.

The wheel supporting section 92 is provided with a hub and bearing structure (shown in FIGS. 13 and 14) such that the wheel 14 is coupled to the wheel supporting section 92 in a conventional manner.

Figure 17:
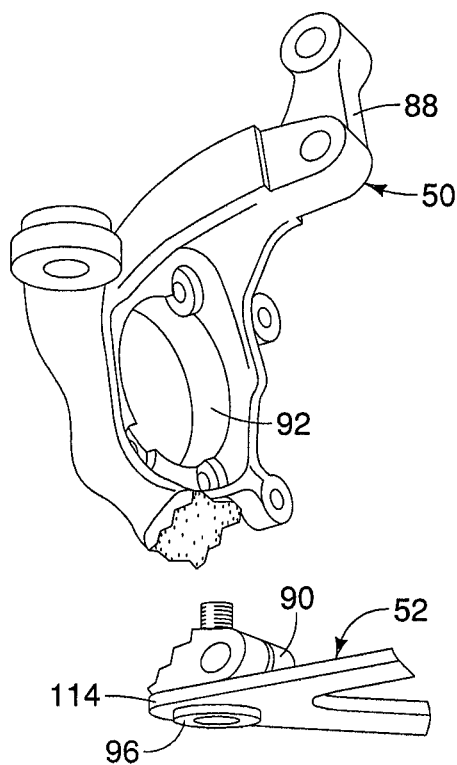
FIG. 17 is a perspective view of the steering knuckle and the transverse link of the front suspension showing the lower knuckle breakaway structure after an impact event releasing the steering knuckle from the outboard end of the strut in accordance with the first embodiment.

During operation of the vehicle 10 (driving), the steering knuckle 50 and the transverse link 52 are pivotally secured to one another by the ball joint 96. During an impact event such as the small overlap test, since the lower knuckle breakaway structure 42 has a thickness $T_3$ less than the thickness $T_4$, if breakage occurs, the lower knuckle breakaway structures 42 breaks, releasing the steering knuckle 50 from the transverse link 52. Put another way, since the cross-sectional area of the lower knuckle breakaway structure 42 is less than the cross-sectional area of the adjacent areas of the lower end 90 of the steering knuckle 50, if breakage occurs, the lower knuckle breakaway structures 42 breaks, releasing the steering knuckle 50 from the transverse link 52. Hence, the steering knuckle 50 (and the wheel 14) are free to move away from the transverse link 52 (and out of the wheel well 16), as shown in FIG. 17.

Figure 18:
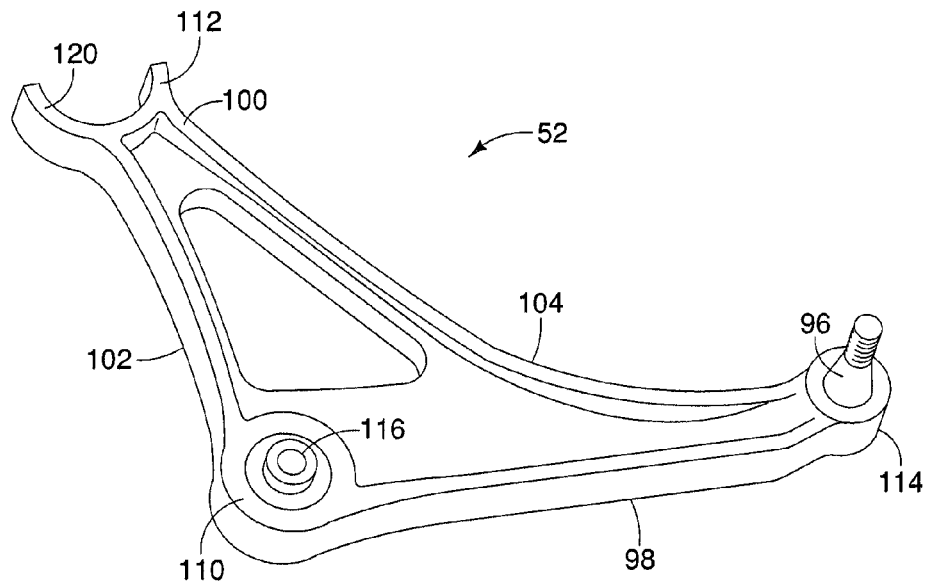
FIG. 18 is a perspective view of the transverse link shown removed from the front suspension, the transverse link having an inboard side with a front attachment point and a rear attachment point, and an outboard side in accordance with the first embodiment.

The transverse link breakaway structure 44 will now be described with specific reference to FIGS. 18 thru 25. As shown in FIG. 18, the transverse link 52 includes a front end 98, a rear end 100, an inboard side 102 and an outboard side 104. The inboard side 102 includes a front attachment point 110 and a rear attachment point 112. The outboard side 104 includes a knuckle attachment point 114, which includes the ball joint 96.

The front attachment point 110 of the transverse link 52 includes a collar 116 that is attached to the engine cradle 46 (the lower suspension supporting portion) at the first location 72 (the front link attachment point) by one of the fasteners $F_1$. The collar 116 is a flexible coupling collar that includes a rubber or polymeric sleeve (not shown) that allows the transverse link 52 undergo vertical oscillations in response to various driving conditions in a conventional manner. Since such collars are conventional, further description is omitted for the sake of brevity.

Figure 19:
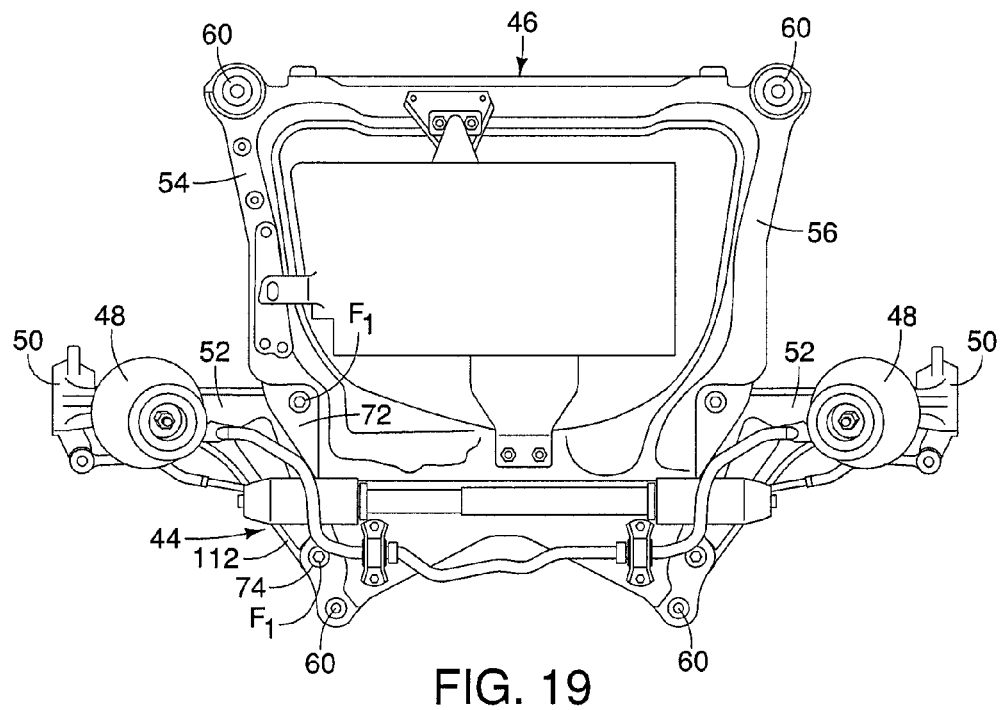
FIG. 19 is a top view of the front suspension showing the front attachment point and the rear attachment point of the inboard side of the transverse link connected to the engine cradle defining a transverse link breakaway structure in accordance with the first embodiment.

The collar 116 and corresponding one of the fasteners $F_1$ define a front connection structure of the transverse link 52 connecting the front end 98 of the transverse link 52 to engine cradle 46 at the first location 72, as indicated in FIG. 19. As will be understood in the drawings and the description herein below, the fastener $F_1$ at the first location 72 is a frangible part that is configured to break in response to the impact event.

The rear attachment point 112 of the transverse link 52 is coupled to the engine cradle 46 at the second location 74 (the rear link attachment point) by the other of the fasteners $F_1$ in a manner that is described in greater detail below. The knuckle supporting section 114 is attached to the steering knuckle 50 via the ball joint 96.

Figure 22:
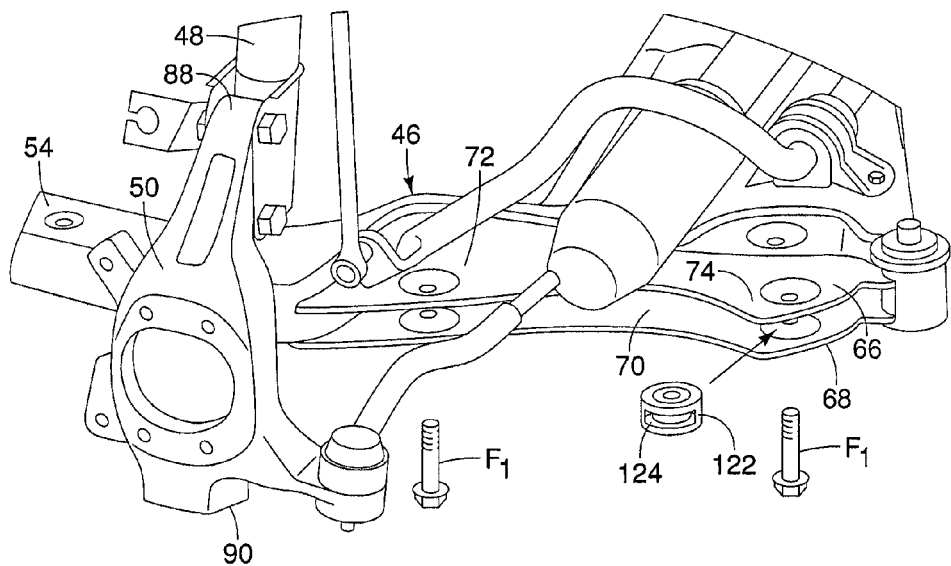
FIG. 22 is a perspective view of a rear side section of the engine cradle showing a lower suspension support structure including an upper flange and a lower flange and a collar configured to receive the rear attachment point of the transverse link in accordance with the first embodiment.
Figure 23:
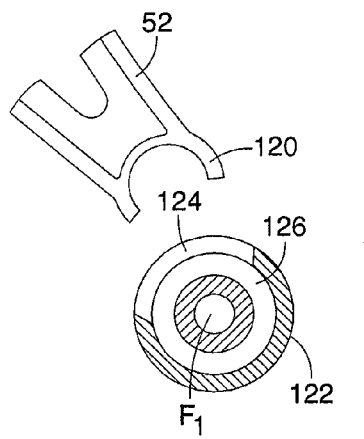
FIG. 23 is a cross-sectional view of the collar and the rear attachment point of the transverse link showing details of a recess defined within the collar, the recess being dimensioned to receive and retain the rear attachment point of the transverse link in accordance with the first embodiment.
Figure 24:
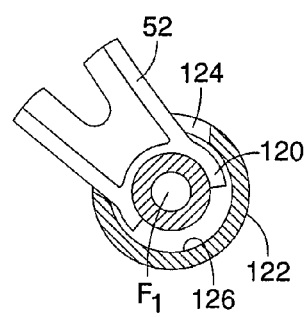
FIG. 24 is another cross-sectional view of the collar and the rear attachment point of the transverse link similar to FIG. 23, showing the transverse link in a released orientation with the rear attachment point being inserted into the recess of the collar, but being releasable from the collar in accordance with the first embodiment.
Figure 25:
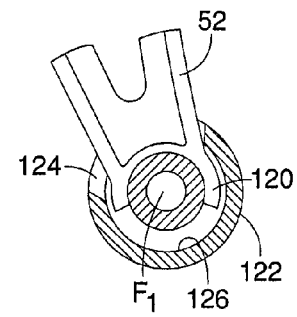
FIG. 25 is yet another cross-sectional view of the collar and the rear attachment point of the transverse link similar to FIGS. 23 and 24, showing the transverse link in an installed orientation with the rear attachment point being retained within the recess of the collar in accordance with the first embodiment.
Figure 26:
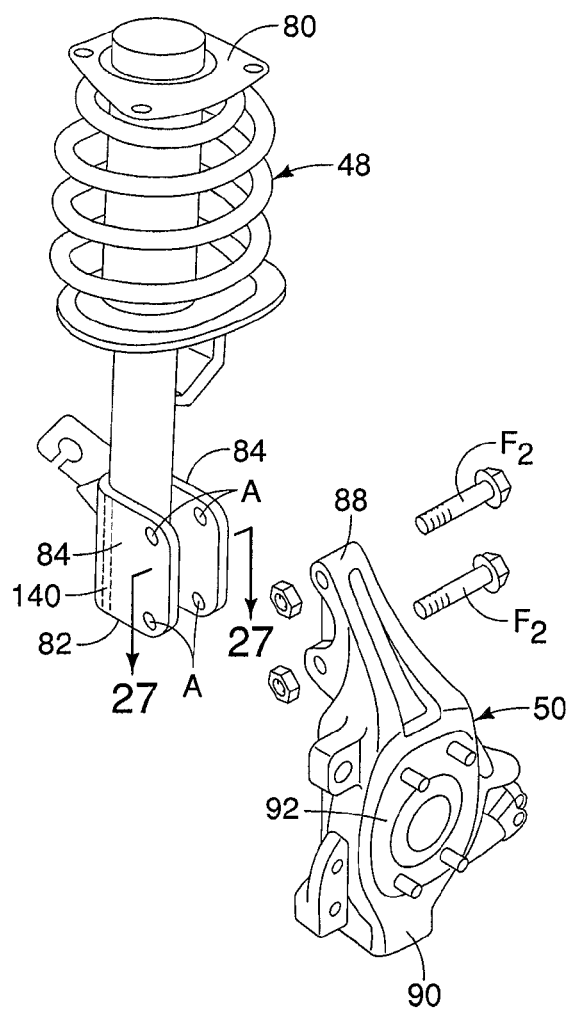
FIG. 26 is an exploded perspective view of the strut and the steering knuckle of the front suspension showing an upper knuckle breakaway structure in accordance with a second embodiment.
Figure 27:
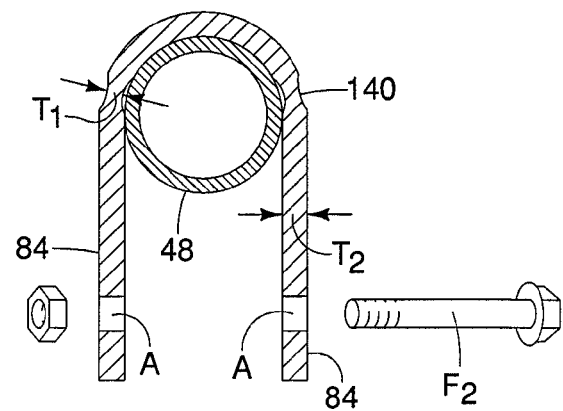
FIG. 27 is a cross-sectional view of a lower end of the strut taken along the line 27-27 in FIG. 26, showing details of knuckle attachment flanges that include the upper knuckle breakaway structure in accordance with the second embodiment.
Figure 28:
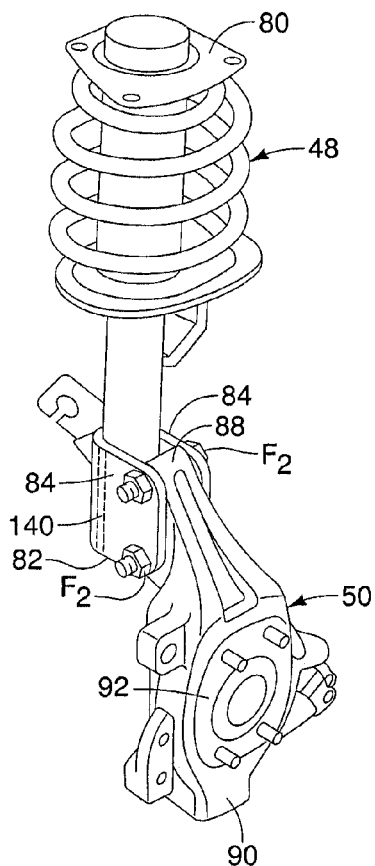
FIG. 28 is a perspective view of the strut and the steering knuckle of the front suspension fully assembled showing the upper knuckle breakaway structure in accordance with the second embodiment.

As shown in FIG. 18, the rear attachment point 112 of the transverse link 52 includes a crescent shaped attachment portion 120. As indicated in FIG. 22, a collar 122 is inserted into the recess 70 between the upper flange 66 and the lower flange 68 (the lower suspension support structure). As shown in FIGS. 23-25, the collar 122 includes an opening 124 that exposes an arcuate shaped recess 126. The opening 124 is dimensioned such that the collar 122 passes into the arcuate shaped recess 126, as indicated in FIG. 24. Thereafter, the transverse link 52 is pivoted into an installed orientation such that the transverse link 52 is retained by the collar 122, as shown in FIG. 25. With the collar 122 installed to the second location 74 of the engine cradle 46, as shown in FIGS. 19 and 25, the rear attachment point 112 secures the transverse link 52 in position relative to the engine cradle 46 during normal driving operation of the vehicle 10. As is explained further below, the relationship between the collar 122 and the rear attachment point 112 of the transverse link 52 define a rear link breakaway structure that allows the transverse link 52 to be released from the engine cradle 46 in response to an impact event, such as the small overlap test.

FIG. 19 shows the transverse link 52 installed to the engine cradle 46 in the installed orientation with the fastener $F_1$ at the first location 72 retaining the front attachment point 110 of the transverse link 52 to the engine cradle 46. Further, the collar 122 and the other of the fasteners $F_1$ retain the rear attachment point 112 of the transverse link at the second location 74 of the engine cradle 46. As well, although not shown in FIG. 19, the ball joint 96 is installed to the steering knuckle 50, retaining the knuckle supporting section 114 of the outboard side 104 of the transverse link 52 to the steering knuckle 50.

During normal operation of the vehicle 10, the strut 48 can undergo vertical oscillations as a result of uneven road surfaces, the steering knuckle 50 can pivot about the strut 48 in response to steering operations of the vehicle 10 and the outboard side 104 of the transverse link 52 can undergo vertical oscillations as a result of uneven road surfaces due to the conventional flexing of the collar 116 and the collar 122.

Figure 20:
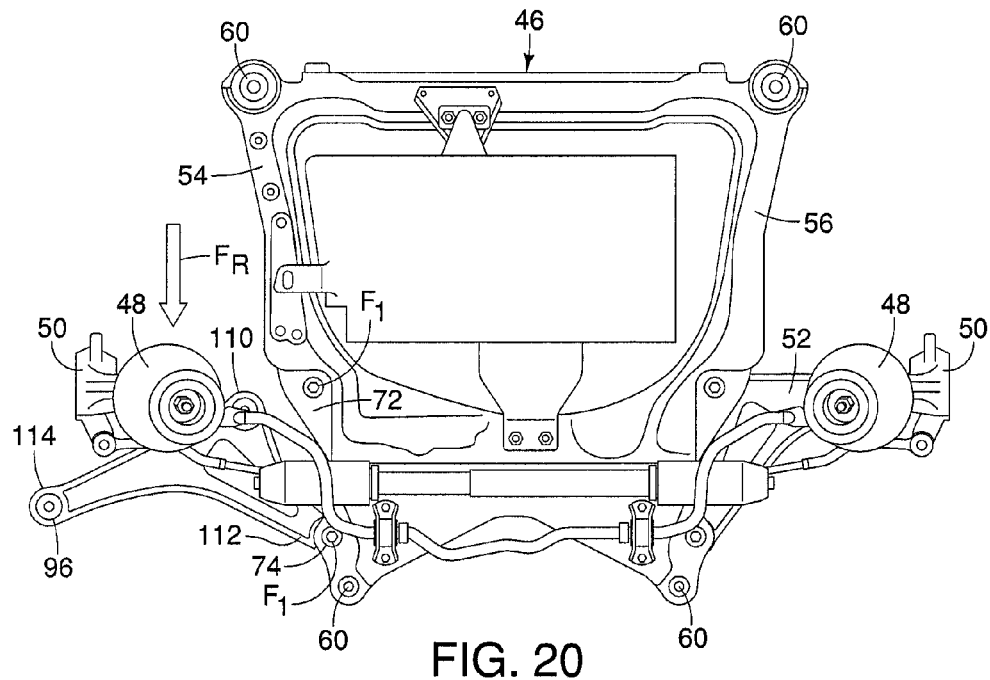
FIG. 20 is another top view of the front suspension showing the front attachment point of the transverse link breaking away from the engine cradle in an initial response to the impact event in accordance with the first embodiment.
Figure 21:
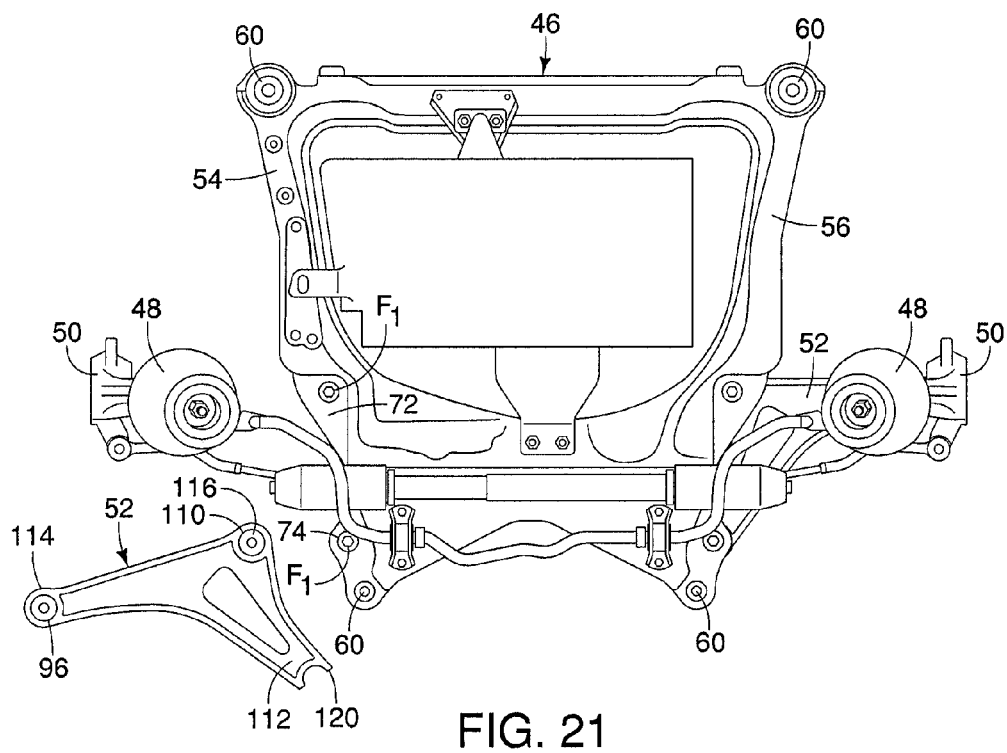
FIG. 21 is yet another top view of the front suspension showing the rear attachment point of the transverse link breaking away from the engine cradle in a further response to the impact event in accordance with the first embodiment.

During an impact event, such as the small overlap test, the transverse link 52 can breakaway from the engine cradle 46, as described now with reference to FIGS. 20 and 21. Specifically, when an impacting force such as a prescribed rearward directed force $F_R$ acts on one or all of the strut 48, the steering knuckle 50 and/or the transverse link 52, the fastener $F_1$ at the first location 72 serves a front link breakaway structure. Specifically, as indicated in FIG. 20, upon application of the prescribed rearward directed force $F_R$, the fastener $F_1$ at the first location 72 breaks (the fastener $F_1$ at the first location 72 is a frangible part). As the impact event progresses, the transverse link 52 pivots relative to the second location 74, as shown in FIG. 20. Thus, the transverse link 52 pivots from the installed orientation (FIGS. 19 and 25) to the release orientation (FIGS. 20 and 24). The transverse link 52 is no longer retained by the collar 122 and the crescent shaped attachment portion 120 can slip out of the opening 124 of the collar 122, as indicated in FIGS. 21 and 23.

During the impact event, the lower knuckle breakaway structure 42, as described above, breaks away allowing the knuckle supporting section 114 of the transverse link 52 to be released from the steering knuckle 50. At the same time, it is also possible for the upper knuckle breakaway structure 40 to release the steering knuckle 50 from the strut 48, as described above. Consequently, the steering knuckle 50 and the wheel 14 are released and can exit the wheel well 16 of the vehicle 10.

In the first embodiment described above, the front suspension 12 is described as including all three of the breakaway features, the upper knuckle breakaway structure 40, the lower knuckle breakaway structure 42 and the transverse link breakaway structure 44. However, it should be understood from the drawings and the description herein that each of the breakaway features can be used independently or in combination with only one of the other two breakaway features. Specifically, the upper knuckle breakaway structure 40 can be employed without one or the other of the lower knuckle breakaway structure 42 and the transverse link breakaway structure 44. Similarly, the lower knuckle breakaway structure 42 can be employed without one or the other of the upper knuckle breakaway structure 40 and the transverse link breakaway structure 44, and the transverse link breakaway structure 44 can be employed without one or the other of the upper knuckle breakaway structure 40 and the lower knuckle breakaway structure 42.

Further, various alternative embodiments of each of the upper knuckle breakaway structure 40, the lower knuckle breakaway structure 42 and the transverse link breakaway structure 44, are described below. The upper knuckle breakaway structure 40 of the first embodiment can be replaced with one of the alternative upper knuckle breakaway structure embodiments described below. The lower knuckle breakaway structure 42 of the first embodiment can be replaced with one of the alternative lower knuckle breakaway structure embodiments described below. Further, the transverse link breakaway structure 44 can be replaced with one of the alternative transverse link breakaway structure embodiments described below.

Second Embodiment

Referring now to FIGS. 26-29, an upper knuckle breakaway structure 140 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 29:
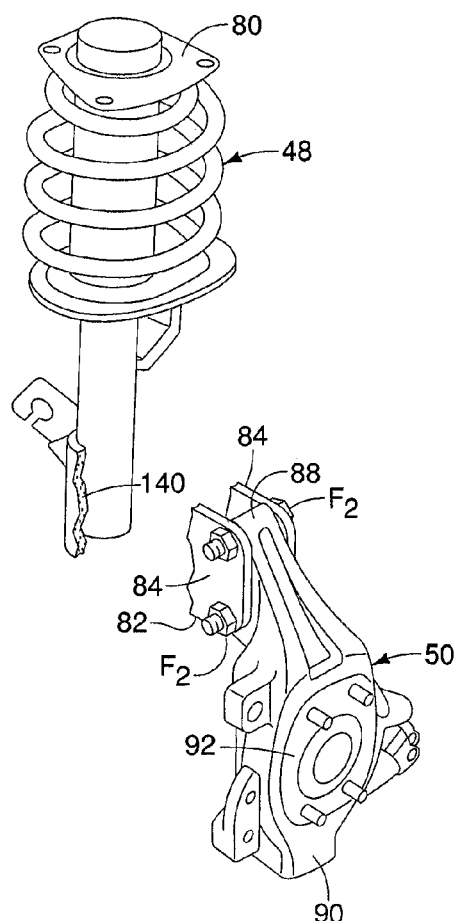
FIG. 29 is a perspective view of the strut and the steering knuckle of the front suspension showing the upper knuckle breakaway structure after an impact event releasing the steering knuckle from the lower end of the strut in accordance with the second embodiment.
Figure 30:
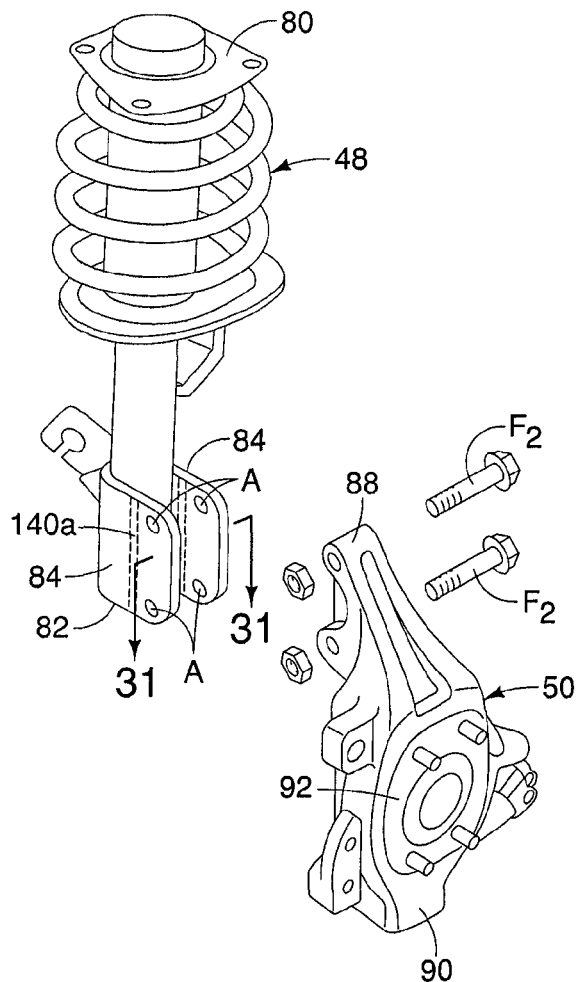
FIG. 30 is an exploded perspective view of the strut and the steering knuckle of the front suspension showing an upper knuckle breakaway structure in accordance with a third embodiment.
Figure 31:
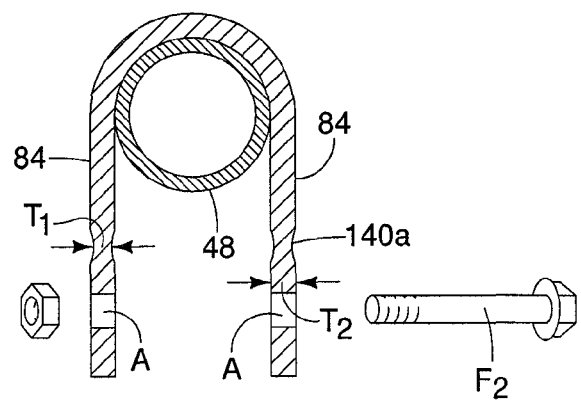
FIG. 31 is a cross-sectional view of a lower end of the strut taken along the line 31-31 in FIG. 30, showing details of knuckle attachment flanges of the strut that include the upper knuckle breakaway structure in accordance with the third embodiment.
Figure 32:
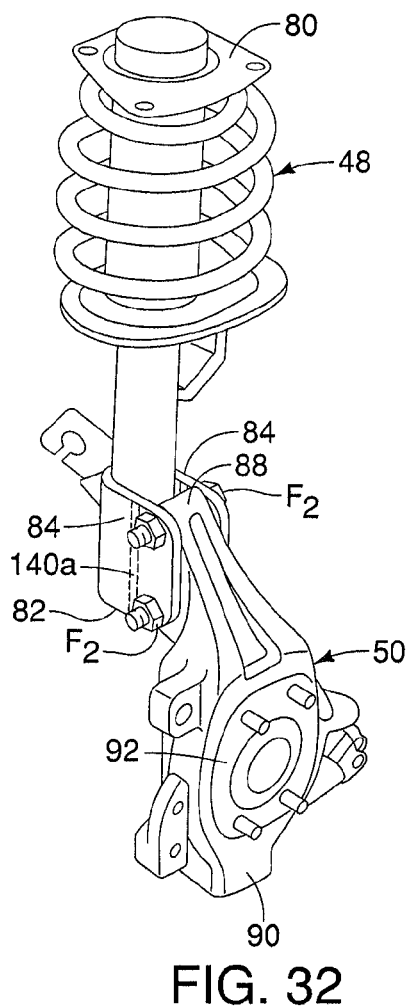
FIG. 32 is a perspective view of the strut and the steering knuckle of the front suspension fully assembled showing the upper knuckle breakaway structure in accordance with the third embodiment.

In the second embodiment, the strut 48 and the steering knuckle 50 are identical to the first embodiment, except that the upper knuckle breakaway structures 40 has been eliminated and replaced with the upper knuckle breakaway structures 140. As shown in FIGS. 26-29, the upper knuckle breakaway structures 140 are formed such that they extend upright along the surfaces of the knuckle attachment flanges 84 adjacent to an upright part of the strut 48. Each of the knuckle breakaway structures 140 is formed with the thickness $T_1$ which is less than the thickness $T_2$ of the remainder of the knuckle attachment flanges 84. As shown in FIG. 29, in response to the impact event, the majority of the knuckle attachment flanges 84 breakaway from the lower end of the strut 46.

Third Embodiment

Referring now to FIGS. 30-33, an upper knuckle breakaway structure 140a in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

Figure 33:
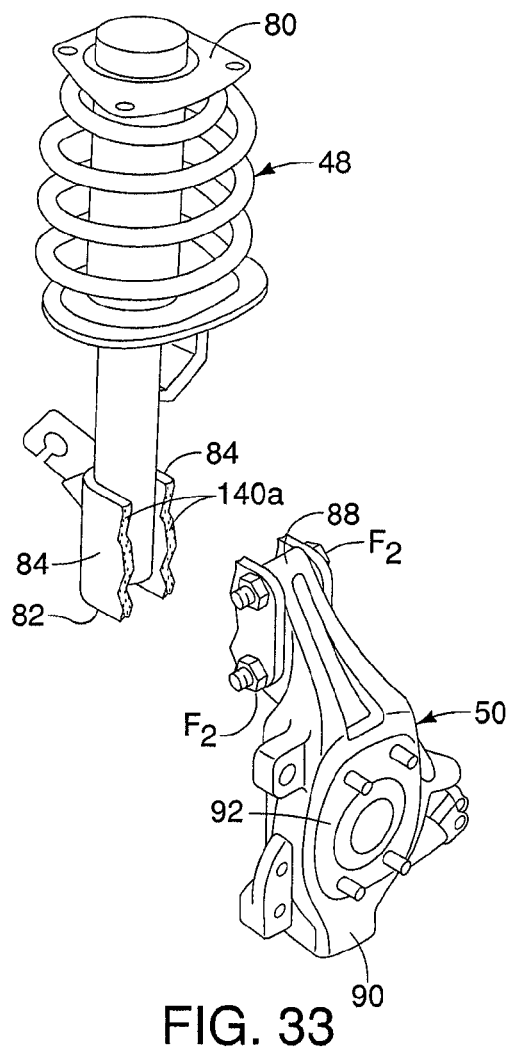
FIG. 33 is a perspective view of the strut and the steering knuckle of the front suspension showing the upper knuckle breakaway structure after an impact event releasing the steering knuckle from the lower end of the strut in accordance with the third embodiment.
Figure 34:
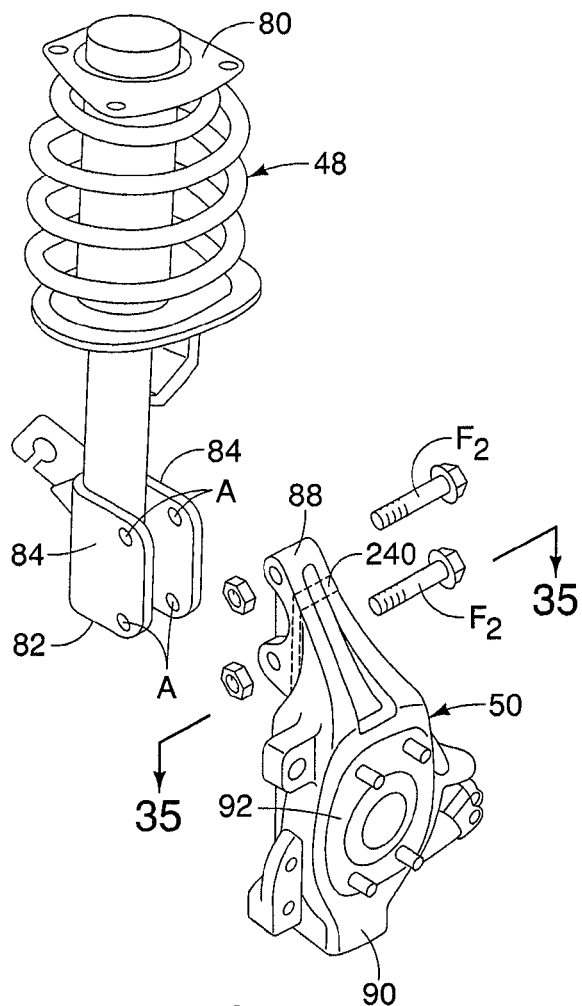
FIG. 34 is an exploded perspective view of the strut and the steering knuckle of the front suspension showing an upper knuckle breakaway structure in accordance with a fourth embodiment.
Figure 35:
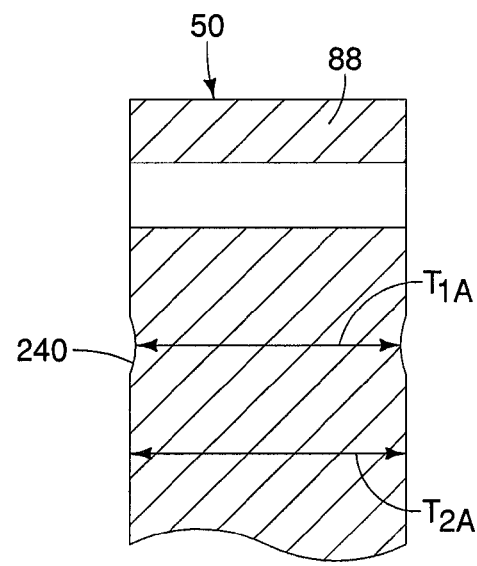
FIG. 35 is a cross-sectional view of an upper end of the steering knuckle taken along the line 35-35 in FIG. 34, showing details of the upper end of the steering knuckle that includes the upper knuckle breakaway structure in accordance with the fourth embodiment.
Figure 36:
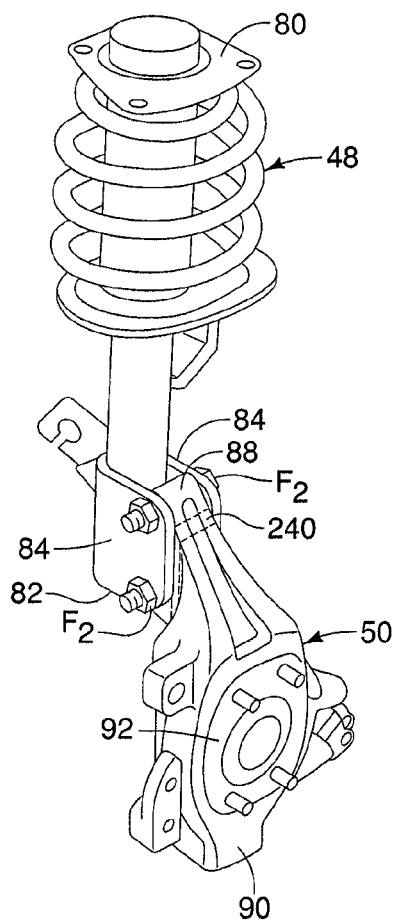
FIG. 36 is a perspective view of the strut and the steering knuckle of the front suspension fully assembled showing the upper knuckle breakaway structure in accordance with the fourth embodiment.

In the third embodiment, the strut 48 and the steering knuckle 50 are identical to the first embodiment, except that the upper knuckle breakaway structures 40 has been eliminated and replaced with the upper knuckle breakaway structure 140a. As shown in FIGS. 30-33, the upper knuckle breakaway structures 140a are formed such that they extend upright along a mid-section of the surfaces of the knuckle attachment flanges 84. Each of the upper knuckle breakaway structures 140a is formed with the thickness $T_1$ which is less than the thickness $T_2$ of the remainder of the knuckle attachment flanges 84. As shown in FIG. 33, in response to the impact event, a portion of the knuckle attachment flanges 84 breakaway from the lower end of the strut 46.

Fourth Embodiment

Referring now to FIGS. 34-37, an upper knuckle breakaway structure 240 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

Figure 37:
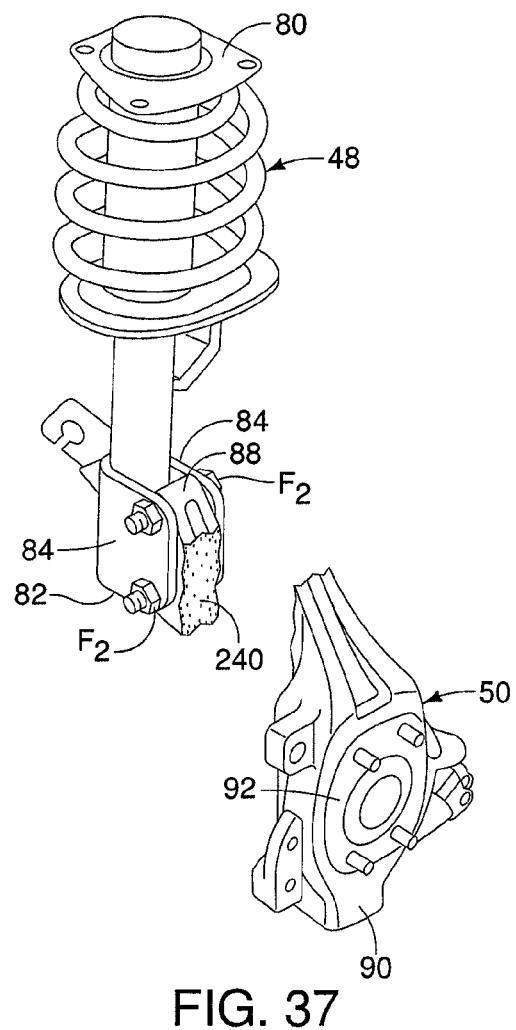
FIG. 37 is a perspective view of the strut and the steering knuckle of the front suspension showing the upper knuckle breakaway structure after an impact event releasing the steering knuckle from the lower end of the strut in accordance with the fourth embodiment.

In the fourth embodiment, the strut 48 and the steering knuckle 50 include all the features described above with respect to the first embodiment, except that the upper knuckle breakaway structures 40 has been eliminated from the knuckle attachment flanges 84 of the strut 48 and replaced with the upper knuckle breakaway structure 240 formed at the upper end 88 of the steering knuckle 50. As shown in FIGS. 34-37, the upper knuckle breakaway structure 240 is formed at the upper end 88 of the steering knuckle 50. The upper knuckle breakaway structure 240 has a thickness $T_{1A}$ which is less than the thickness $T_{2A}$ of the remainder of the upper end 88 of the steering knuckle 50. Consequently, the cross-sectional area of the upper knuckle breakaway structure 240 is less than the remainder of the upper end of the steering knuckle 50. As shown in FIG. 37, in response to the impact event, a portion of the upper end 88 of the steering knuckle 50 remains attached to the attachment flanges 84 of the strut 46.

Fifth Embodiment

Figure 38:
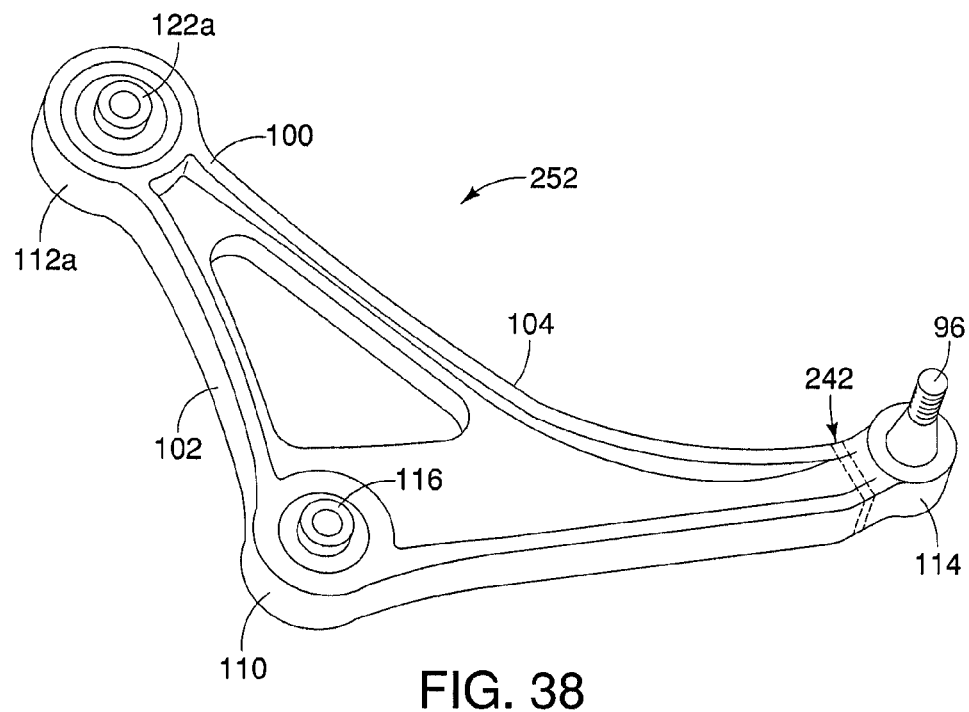
FIG. 38 is a perspective view of a transverse link shown removed from the front suspension, with an outboard side of the transverse link having a lower knuckle breakaway structure in accordance with a fifth embodiment.
Figure 39:
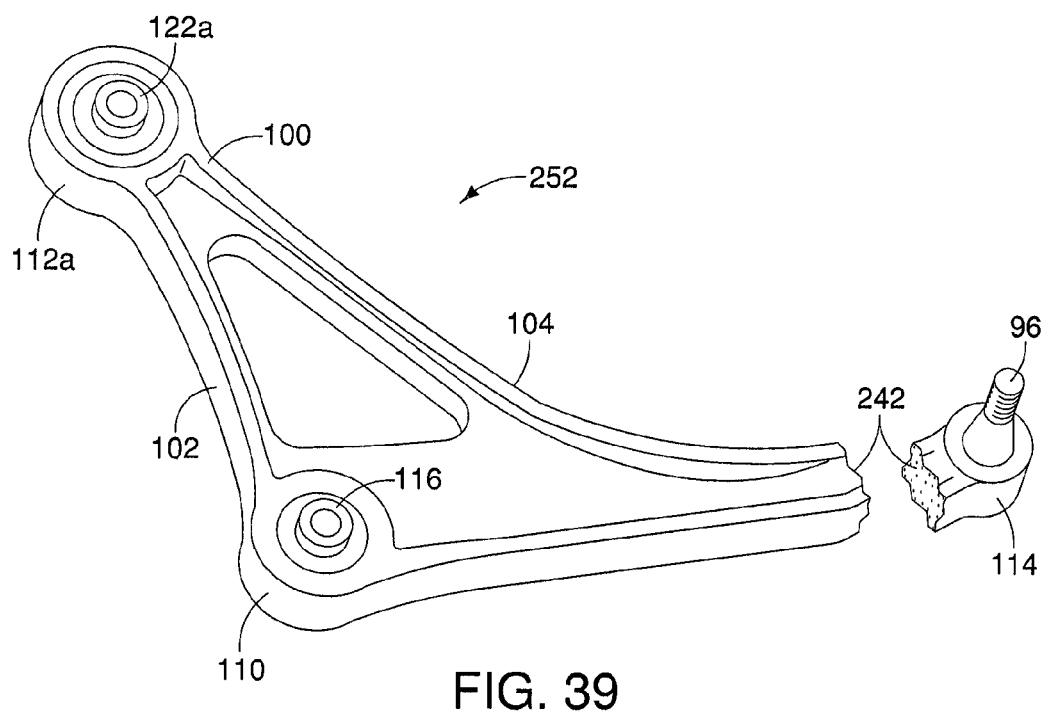
FIG. 39 is another perspective view of the transverse link shown in FIG. 38 showing the lower knuckle breakaway structure after an impact event releasing the ball joint (and the steering knuckle) from the outboard side of the transverse link in accordance with the fifth embodiment.

Referring now to FIGS. 38-39, a lower knuckle breakaway structure 242 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the transverse link 52 and the collar 122 are replaced with a transverse link 252 and collar 122*a*. The transverse link 252 includes a rear attachment point 112*a* with the conventional collar 122*a*. Hence, there is no breakaway feature at the rear attachment point 112*a*.

The transverse link 252 includes all of the other features of the transverse link 52 of the first embodiment, such as the front attachment point 110 and knuckle supporting section 114, with the ball joint 96. However, adjacent to the knuckle supporting section 114 of the transverse link 252, the transverse link 252 is formed with the lower knuckle breakaway structure 242. The transverse link 252 is provided with reinforcements (as compared to a conventional transverse link) throughout its overall structure, except at the lower knuckle breakaway structure 242. Therefore, the lower knuckle breakaway structure 242 defines a frangible part. Consequently, as indicated in FIG. 39, in response to the impact event, the knuckle supporting section 114 and ball joint 96 breakaway from the remainder of the transverse link 252, allowing the steering knuckle (not shown) and the wheel 14 (not shown) to eject from the wheel well 16 of the vehicle 10 during the impact event.

Sixth Embodiment

Figure 40:
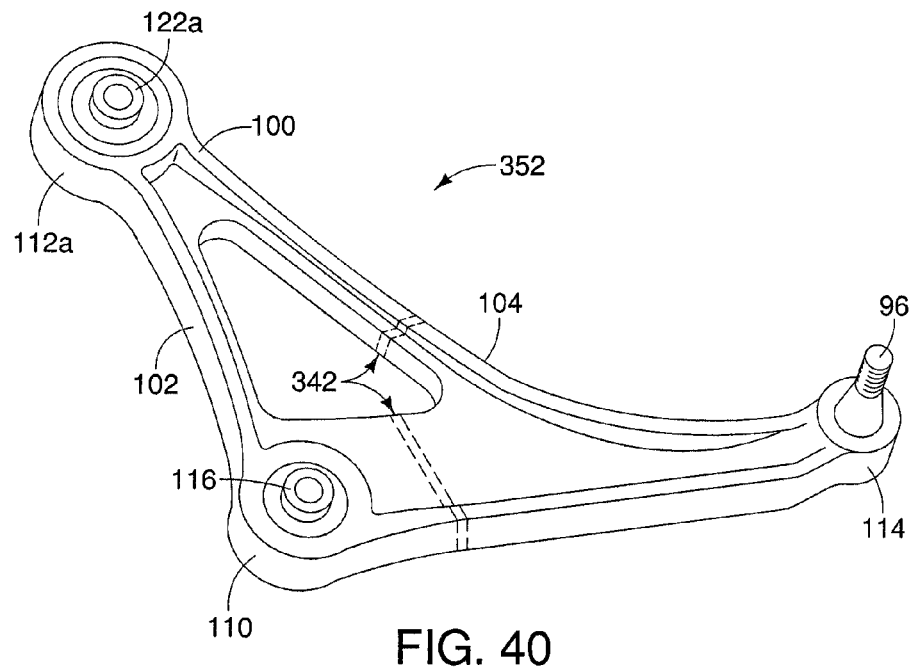
FIG. 40 is a perspective view of a transverse link shown removed from the front suspension, the transverse link having a lower knuckle breakaway structure in accordance with a sixth embodiment.
Figure 41:
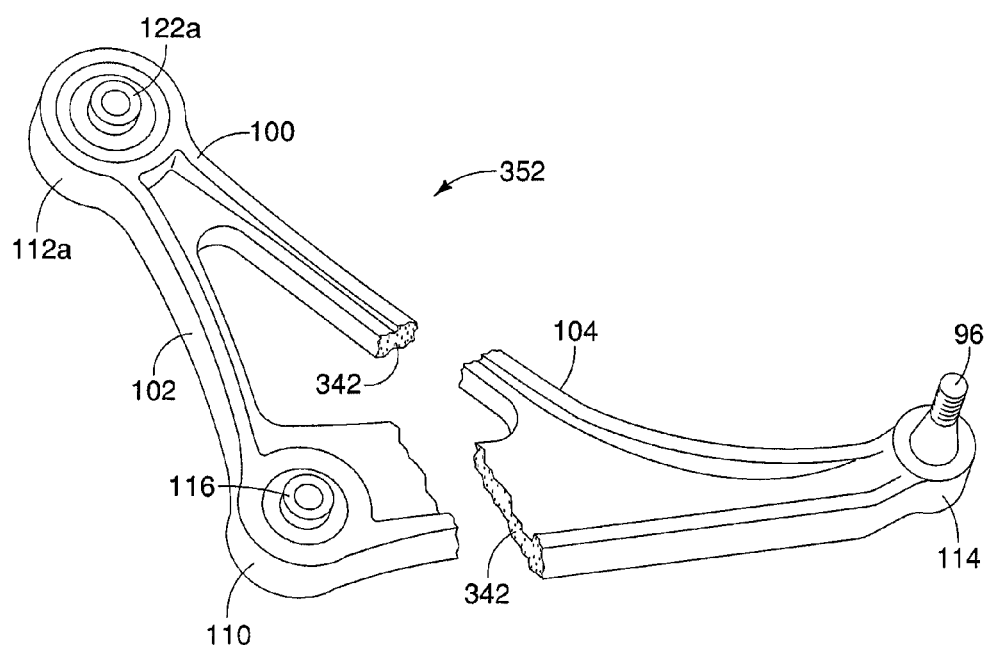
FIG. 41 is another perspective view of the transverse link shown in FIG. 40 showing the lower knuckle breakaway structure after an impact event releasing the ball joint (and the steering knuckle) from the outboard side of the transverse link in accordance with the sixth embodiment.

Referring now to FIGS. 40-41, a lower knuckle breakaway structure 342 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the sixth embodiment, the transverse link 52 and the collar 122 are replaced with a transverse link 352 and the collar 122*a*. The transverse link 352 includes the rear attachment point 112*a* with the conventional collar 122*a*. Hence, there is no breakaway feature at the rear attachment point 112*a*.

The transverse link 352 includes all of the other features of the transverse link 52 of the first embodiment, such as the front attachment point 110 and knuckle supporting section 114, with the ball joint 96. However, between the inboard side 102 and the outboard side 104, the transverse link 352 is formed with the lower knuckle breakaway structure 342. The transverse link 352 is provided with reinforcements (as compared to a conventional transverse link) throughout its overall structure, except at the lower knuckle breakaway structure 342. Therefore, the lower knuckle breakaway structure 342 defines frangible parts of the transverse link 352. Consequently, as indicated in FIG. 41, in response to the impact event, the knuckle supporting section 114 and ball joint 96 breakaway from the remainder of the transverse link 352, allowing the steering knuckle (not shown) and the wheel 14 (not shown) to eject from the wheel well 16 of the vehicle 10 during the impact event.

Seventh Embodiment

Figure 42:
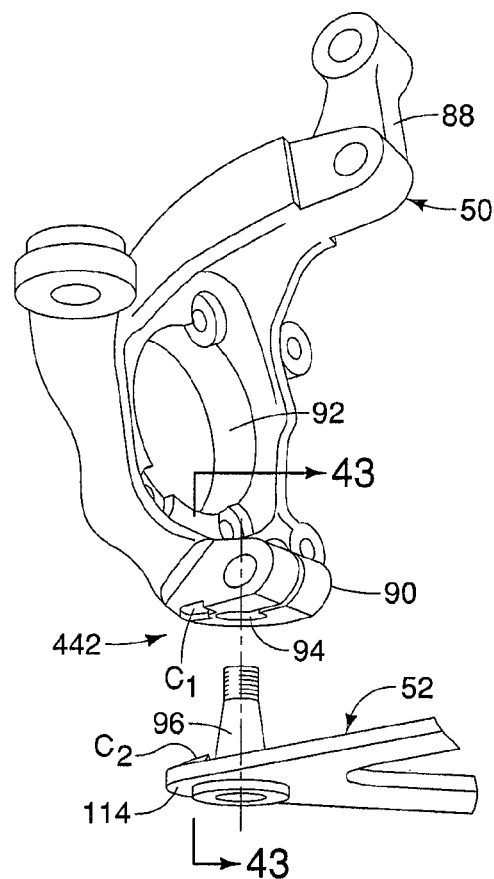
FIG. 42 is an exploded perspective view of the steering knuckle and an outboard end of the transverse link of the front suspension showing a lower knuckle breakaway structure that includes a first cam surface on a lower portion of the steering knuckle and a second cam surface on an outboard side of the transverse link in accordance with a seventh embodiment.
Figure 43:
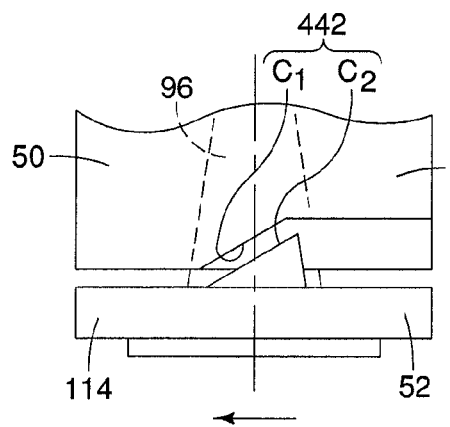
FIG. 43 is a side view of the lower portion of the steering knuckle and the outboard side of the transverse link showing the first and second cam surfaces spaced apart from one another in accordance with the seventh embodiment.
Figure 44:
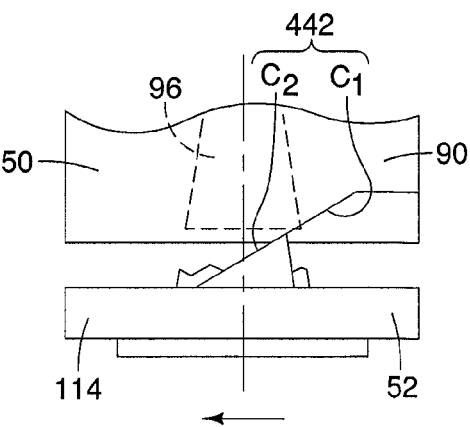
FIG. 44 is another side view of the lower end of the steering knuckle and the outboard side of the transverse link showing the first and second cam surfaces of the lower knuckle breakaway structure contacting each other breaking a portion of the ball joint and releasing the steering knuckle from the transverse link in response to an impact event in accordance with the seventh embodiment.
Figure 45:
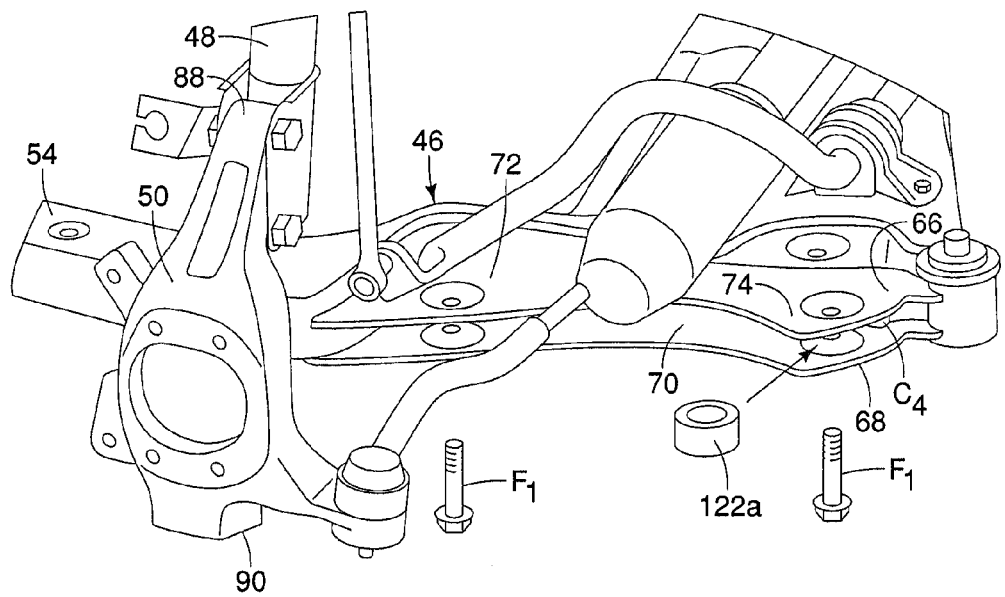
FIG. 45 is a perspective view of the rear side section of the engine cradle showing the lower suspension support structure including the upper flange and the lower flange and a collar configured to receive the rear attachment point of the transverse link in accordance with an eighth embodiment.

Referring now to FIGS. 42-44, a lower knuckle breakaway structure 442 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

In the seventh embodiment, the lower end 90 of the steering knuckle 50 is modified to include a first cam surface $C_1$. Further, the knuckle supporting section 114 of the transverse link 52 is modified to include a second cam surface $C_2$. As is well known, the ball joint 96 is a structural member that connects to the steering knuckle 50 and allows the steering knuckle 50 to pivot about a vertical axis defined by the ball joint 96 such that the steering knuckle 50 can pivot for steering operations of the vehicle 10. The first cam surface $C_1$ and the second cam surface $C_2$ are positioned such that during steering operations of the vehicle 50, the first cam surface $C_1$ and the second cam surface $C_2$ do not contact one another, as indicated in FIG. 43. However, in response to an impact event where at least one member of the front suspension 12 has broken away from the engine cradle 46, the steering knuckle 50 and the transverse link 52 can undergo relative rotation with respect to one another such that the first cam surface $C_1$ and the second cam surface $C_2$ contact one another, forcing the transverse link 52 to move downward and away from the steering knuckle 50, as indicated in FIG. 44. This downward movement of the transverse link 52 can cause the ball joint 96 to pull out of the steering knuckle 50 or cause the ball joint 96 to break, as shown in FIG. 44, thereby allowing the steering knuckle 50 and the wheel 14 (not shown) to eject from the wheel well 16 of the vehicle 10 during the impact event.

Eighth Embodiment

Referring now to FIGS. 45-48, a transverse link breakaway structure 344 in accordance with an eighth embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity.

Figure 46:
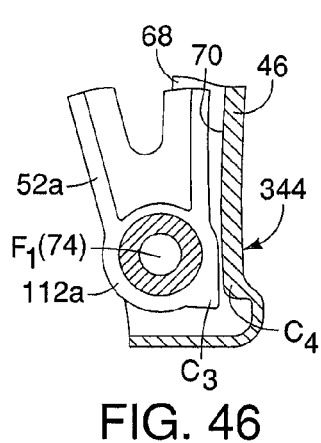
FIG. 46 is a cross-sectional view of the engine cradle and the rear attachment point of the transverse link showing details of transverse link breakaway structure that includes a first cam surface formed on the transverse link and a second cam surface formed within the recess of the engine cradle in accordance with the eighth embodiment.
Figure 47:
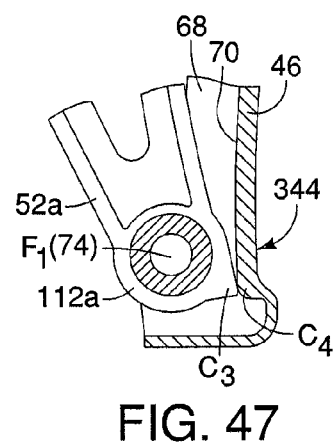
FIG. 47 is another cross-sectional view of the engine cradle and the rear attachment point of the transverse link similar to FIG. 46, showing the transverse link beginning to rotate about the rear attachment point such that the first and second cam surfaces begin to contact one another in response to an impact event in accordance with the eighth embodiment.
Figure 48:
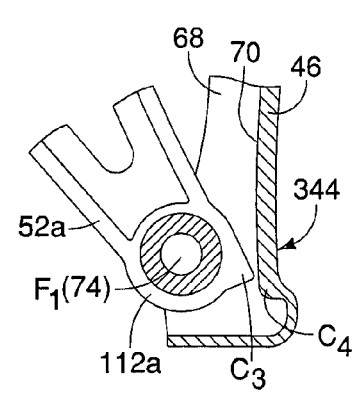
FIG. 48 is yet another cross-sectional view of the engine cradle and the rear attachment point of the transverse link similar to FIGS. 46 and 47, showing the transverse link breaking away from the engine cradle in response to continued contact between the first and second cam surfaces causing the fastener to break, releasing the transverse link from the engine cradle in accordance with the eighth embodiment.

In the eighth embodiment, the transverse link 52 of the first embodiment is replaced with a transverse link 52*a* that includes a full ring structure at the rear attachment point 112*a* and a first cam surface $C_3$. A conventional collar is installed within the full ring structure of the rear attachment point 112*a* and the fastener $F_1$ attaches the transverse link 52*a* to the engine cradle 46 at the second location 74. As shown in FIGS. 46-48, the first cam surface $C_3$ faces the engine cradle 46 within the recess 70. Also, in the eighth embodiment, the engine cradle 46 is slightly modified by the inclusion of a second cam surface $C_4$ formed within the recess 70, as is also shown in FIGS. 46-48.

With the transverse link 52a in an installed orientation depicted in FIG. 46, the first cam surface $C_3$ and the second cam surface $C_4$ are spaced apart from one another. However, in response to an impact event, when the fastener $F_1$ at the first location 72 serves as a frangible part and breaks, the transverse link 52a begins to pivot about the fastener $F_2$ at the second location 74, as indicated in FIG. 47. As is further shown in FIG. 47, the first cam surface $C_3$ and the second cam surface $C_4$ begin to contact one another. Further rotation of the transverse link 52a during the impact event causes the first cam surface $C_3$ and the second cam surface $C_4$ to press against one another forcing the rear attachment point 112a of the transverse link 52 to exert a force on the fastener $F_1$ at the second location 74, causing the fastener $F_1$ at the second location 74 to break (a frangible portion), thereby allowing the transverse link 52a to be released from the engine cradle 46.

Ninth Embodiment

Figure 49:
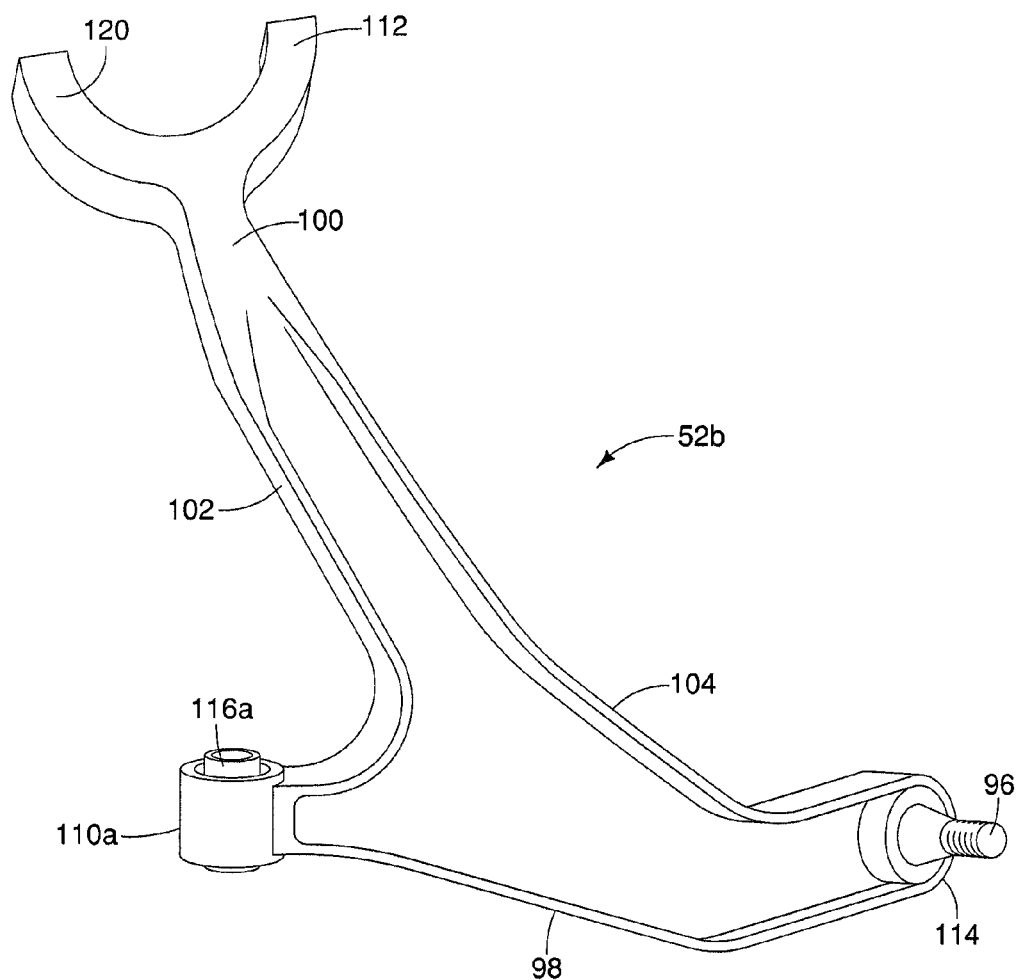
FIG. 49 is a perspective view of a transverse link that includes a front attachment point that includes a collar oriented horizontally in accordance with a ninth embodiment.

Referring now to FIG. 49, a transverse link 52b in accordance with a ninth embodiment will now be explained. In view of the similarity between the first and ninth embodiments, the parts of the ninth embodiment that are identical to the parts of the first embodiment will be given the same reference numerals as the parts of the first embodiment. Moreover, the descriptions of the parts of the ninth embodiment that are identical to the parts of the first embodiment may be omitted for the sake of brevity.

The transverse link 52b includes all of the features of the transverse link 52 of the first embodiment, except that the front attachment point 110 of the first embodiment is replaced with a modified front attachment point 110a. More specifically, the transverse link 52b includes the following features of the transverse link 52, for example, the front end 98, the rear end 100, the inboard side 102, the outboard side 104, the rear attachment point 112 with the crescent shaped attachment portion 120 and the knuckle supporting section 114 with the ball joint 96.

However, in the first embodiment, the fasteners $F_1$ at the first location 72 and the second location 74 of the engine cradle 46 are vertically oriented. In the ninth embodiment, the front attachment point 110a is oriented such that a corresponding fastener is horizontally oriented. Otherwise, the transverse link 52b is identical to the transverse link 52b of the first embodiment.

The vehicle 10 includes a variety of elements and features are conventional components that are well known in the art. Since these elements and features are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle front suspension. Accordingly, these terms, as utilized to describe the present invention should be interpreted relative to a vehicle equipped with the vehicle front suspension.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle front suspension comprising;
    a suspension support structure; and
    a transverse link having an inboard side with a front connection structure connecting a front end of the transverse link to the suspension support structure at a first location and a rear connection structure that includes a vertically oriented pin pivotally connecting a rear end of the transverse link to the suspension support structure at a second location that is spaced rearwardly of the first location;
    a front link breakaway structure configured to release the front end of the transverse link from the suspension support structure upon application of a prescribed rearward directed force on the vehicle front suspension outboard of the suspension support structure; and
    a rear link breakaway structure configured to release the rear connection structure of the transverse link from the suspension support structure upon rearward rotation of the transverse link about the vertically oriented pin.

2. The vehicle front suspension according to claim 1, wherein
    the front link breakaway structure includes a frangible part formed on the suspension support structure at the first location.

3. The vehicle front suspension according to claim 1, wherein
    the front link breakaway structure includes a frangible part formed at the front end of the transverse link.

4. The vehicle front suspension according to claim 1, wherein
the rear link breakaway structure is configured such that the suspension support structure at the second location includes a frangible portion such that with the transverse link in an installed orientation the transverse link is retained by the suspension support structure, and with the transverse link moved to a release orientation, the frangible portion releases the transverse link from the suspension support structure.

5. The vehicle front suspension according to claim 1, wherein
the rear link breakaway structure includes the vertically oriented pin being a frangible pin that connects the rear connection structure of the transverse link to the suspension support structure at the second location.

6. The vehicle front suspension according to claim 1, wherein
the rear link breakaway structure includes a frangible part formed on an attachment flange at the second location of the suspension support structure.

7. The vehicle front suspension according to claim 1, wherein
the rear link breakaway structure includes a first cam defined on a surface of the suspension support structure at the second location, and a second cam surface defined on a surface of the transverse link, the first cam and second cam being positioned such that upon rotation of the transverse link relative to the suspension support structure at the second location, the first and second cam surfaces contact one another forcing the transverse link and the suspension support structure to separate from one another.

8. The vehicle front suspension according to claim 1, further comprising
a steering knuckle having a lower end pivotally coupled to the outboard side of the transverse link, and an upper end;
an upper suspension support structure; and
a strut having an upper end connected to the upper suspension support structure, and a lower end fixedly attached to the upper end of the steering knuckle by an upper knuckle breakaway structure having a predetermined frangible part that releases the upper end of the steering knuckle from the strut upon application of the prescribed rearward directed force on the vehicle front suspension outboard of the suspension support structure.

9. The vehicle front suspension according to claim 1, further comprising
a steering knuckle having a lower end pivotally coupled to the outboard side of the transverse link, and an upper end;
an upper suspension support structure;
a strut having an upper end connected to the upper suspension support structure, and a lower end fixedly attached to the upper end of the steering knuckle; and
a lower knuckle breakaway structure formed on one of the outboard side of the transverse link and the steering knuckle to release the steering knuckle from the transverse link upon application of the prescribed rearward directed force on the vehicle front suspension outboard of the suspension support structure.

10. The vehicle front suspension according to claim 1, wherein
the rear link breakaway structure includes a collar mounted to the suspension support structure at the second location, and
the transverse link includes a crescent shaped attachment portion at least partially surrounding the collar with the transverse link installed to the suspension support structure.

11. The vehicle front suspension according to claim 10, wherein
the collar includes an arcuate shaped recess dimensioned such that with the transverse link in an installed orientation, the crescent shaped attachment portion of the transverse link is retained within the recess and with the transverse link rotated about the collar to a release orientation, the crescent shaped attachment portion of the transverse link is removable from the arcuate shaped recess.

12. The vehicle front suspension according to claim 10, wherein
one of the collar and the crescent shape structure defines a frangible portion that breaks away upon rotation of the transverse link.

13. The vehicle front suspension according to claim 1, wherein
the front link breakaway structure includes a frangible pin that connects the front connection structure of the transverse link to the suspension support structure at the first location.

14. The vehicle front suspension according to claim 13, wherein
the frangible pin extends upright through portions of the transverse link and the suspension support structure.

15. The vehicle front suspension according to claim 13, wherein
the rear link breakaway structure includes the vertically oriented pin being a second frangible pin that connects the rear connection structure of the transverse link to the suspension support structure at the second location.

16. The vehicle front suspension according to claim 15, wherein
the rear link breakaway structure further includes a first cam surface disposed on the rear end of the transverse link and a second cam surface disposed on the suspension support structure at the second location proximate the first cam surface and adjacent to the second frangible pin such that upon rotation of the transverse link about the second frangible pin relative to the suspension support structure, the first cam surface and the second cam surface contact one another applying a breaking force to the second frangible pin.

17. A vehicle front suspension comprising;
a suspension support structure; and
a transverse link having an inboard side with a front connection structure connecting a front end of the transverse link to the suspension support structure at a first location and a rear connection structure pivotally connecting a rear end of the transverse link to the suspension support structure at a second location that is spaced rearwardly of the first location;
a front link breakaway structure including a frangible portion defined on one of the suspension support structure and the front end of the transverse link configured to release the front end of the transverse link from the suspension support structure upon application of a prescribed rearward directed force on the vehicle front suspension outboard of the suspension support structure; and
a rear link breakaway structure including a collar having an opening coupled to the suspension support structure at the second location and a crescent shape structure defining a gap at a rear end of the transverse link configured to release the rear connection structure of the transverse link from the suspension support structure upon rotation of the transverse link about the rear connection structure, wherein upon application of the prescribed rearward directed force on the vehicle front suspension the frangible portion of the front link breakaway structure releases the front end of the transverse link, the transverse link rotates about the rear connection structure, and the gap in the crescent shape structure aligns with the opening in the collar releasing the transverse link from the suspension support structure.

18. A vehicle front suspension comprising;

a suspension support structure; and a transverse link having an inboard side with a front connection structure connecting a front end of the transverse link to the suspension support structure at a first location and a rear connection structure including a crescent shaped attachment portion pivotally connecting a rear end of the transverse link to the suspension support structure at a second location that is spaced rearwardly of the first location;

a front link breakaway structure configured to release the front end of the transverse link from the suspension support structure upon application of a prescribed rearward directed force on the vehicle front suspension outboard of the suspension support structure; and a rear link breakaway structure configured to release the rear connection structure of the transverse link from the suspension support structure upon rearward rotation of the transverse link about the rear connection structure, the rear link breakaway structure including a collar mounted to the suspension support structure at the second location, and the crescent shaped attachment portion of the transverse link at least partially surrounding the collar with the transverse link installed to the suspension support structure.

19. The vehicle front suspension according to claim 18, wherein the collar includes an arcuate shaped recess dimensioned such that with the transverse link in an installed orientation, the crescent shaped attachment portion of the transverse link is retained within the recess and with the transverse link rotated about the collar to a release orientation, the crescent shaped attachment portion of the transverse link is removable from the arcuate shaped recess.

20. The vehicle front suspension according to claim 18, wherein one of the collar and the crescent shape structure defines a frangible portion that breaks away upon rotation of the transverse link.

* * * * *